(12) United States Patent
Sellappa et al.

(10) Patent No.: US 10,594,629 B2
(45) Date of Patent: Mar. 17, 2020

(54) LOAD BALANCING ON MULTI-CHIP NETWORK SWITCH WITHOUT FULL BI-SECTION BANDWIDTH

(71) Applicant: Arista Networks, Inc., Santa Clara, CA (US)

(72) Inventors: Sriram Sellappa, Santa Clara, CA (US); Vipul P. Shah, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/165,542

(22) Filed: Oct. 19, 2018

(65) Prior Publication Data

US 2019/0058673 A1    Feb. 21, 2019

Related U.S. Application Data

(62) Division of application No. 15/233,529, filed on Aug. 10, 2016, now Pat. No. 10,153,988.

(51) Int. Cl.
| | |
|---|---|
| *H04L 12/937* | (2013.01) |
| *H04L 12/761* | (2013.01) |
| *H04L 12/751* | (2013.01) |
| *H04L 12/931* | (2013.01) |
| *H04L 12/707* | (2013.01) |
| *H04L 12/935* | (2013.01) |

(52) U.S. Cl.
CPC ............ *H04L 49/254* (2013.01); *H04L 45/16* (2013.01); *H04L 49/3018* (2013.01); *H04L 49/3027* (2013.01); *H04L 49/351* (2013.01); *H04L 45/02* (2013.01); *H04L 45/24* (2013.01)

(58) Field of Classification Search
CPC ............... H04L 49/254; H04L 49/3018; H04L 49/3027; H04L 45/16; H04L 49/351; H04L 45/24; H04L 45/02
See application file for complete search history.

(56) References Cited

U.S. PATENT DOCUMENTS

| | | | |
|---|---|---|---|
| 6,721,800 B1 | 4/2004 | Basso et al. | |
| 7,359,377 B1 * | 4/2008 | Kompella | ............... H04L 45/50 370/254 |
| 9,634,922 B2 | 4/2017 | Yuksel et al. | |
| 10,069,734 B1 * | 9/2018 | Singh | ...................... H04L 47/12 |

(Continued)

*Primary Examiner* — Shailendra Kumar
(74) *Attorney, Agent, or Firm* — Chamberlain, Hrdlicka, White, Williams & Aughtry

(57) ABSTRACT

A network device includes a first network processor that forwards packets based on a first forwarding information table; a second network processor that forwards packets based on a second forwarding information table; a first group of ports operably connected to the first network processor; and a second group of ports operably connected to the second network processor. The first forwarding information table specifies that packets, received by the first network processor, that specify a destination device reachable by the first group of ports and the second group of ports are forwarded by a port of the first group of ports. The second forwarding information table specifies that packets, received by the second network processor, that specify the destination device reachable by the first group of ports and the second group of ports are forwarded by a port of the second group of ports.

12 Claims, 16 Drawing Sheets

(56) References Cited

U.S. PATENT DOCUMENTS

| | | | |
|---|---|---|---|
| 2003/0002443 A1* | 1/2003 | Basso | H04L 45/00 370/237 |
| 2005/0013308 A1 | 1/2005 | Wybenga et al. | |
| 2011/0007743 A1 | 1/2011 | Kuwabara et al. | |
| 2011/0243135 A1 | 10/2011 | Singh et al. | |
| 2013/0286846 A1* | 10/2013 | Atlas | H04L 45/34 370/236 |
| 2016/0099859 A1* | 4/2016 | Mohammadi | H04L 43/50 370/248 |

* cited by examiner

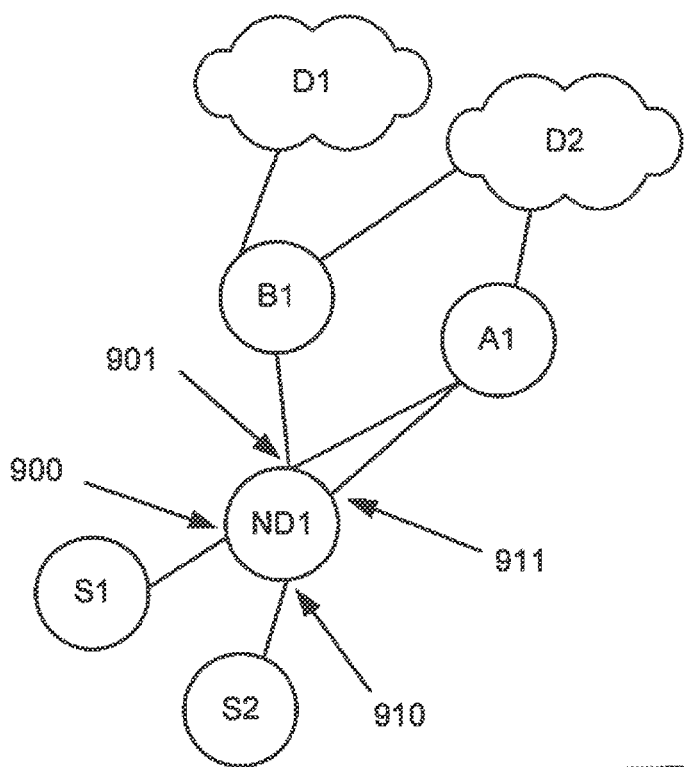

Shared Nexthop Table

| Nexthop Index | Egress Port/Mac Address |
|---|---|
| A | 1/D1 |
| B | 1/B1 |
| C | 2/A1 |
| D | 2/C1 |
| E | 2/C1 |

FIG. 11C

First Multipath Table Associated with the First Network Processor

| Multipath Index | Nexthop Index(s) | Size |
|---|---|---|
| 1 | A | 2 |

FIG. 11D

Second Multipath Table Associated with Second Network Processor

| Multipath Index | Nexthop Index(s) | Size |
|---|---|---|
| 1 | C | 2 |
| 2 | E | 1 |

FIG. 11E

| First Nexthop Table Associated with First Network Processor ||
|---|---|
| Nexthop Index | Egress Port/Mac Address |
| A | 1/D1 |
| B | 1/B1 |

FIG. 11F

| Second Nexthop Table Associated with Second Network Processor ||
|---|---|
| Nexthop Index | Egress Port/Mac Address |
| A | 2/A1 |
| B | 2/C1 |
| C | 2/C1 |

FIG. 11G

| Shared Multipath Table ||
|---|---|
| Multipath Index | Nexthop Index(s) |
| 1 | A |
| 2 | C |

FIG. 11H

| Nexthop Table Associated with First Network Processor | |
|---|---|
| Nexthop Index | Egress Port/Mac Address |
| A | 1/D1 |
| B | 1/B1 |

FIG. 11I

| Nexthop Table Associated with Second Network Processor | |
|---|---|
| Nexthop Index | Egress Port/Mac Address |
| A | 2/A1 |
| B | 2/C1 |
| C | 2/C1 |

FIG. 11J

| First Multipath Table Associated with First Network Processor | | |
|---|---|---|
| Multipath Index | Nexthop Index(s) | Size |
| 1 | A | 2 |

FIG. 11K

| Second Multipath Table Associated with Second Network Processor | | |
|---|---|---|
| ECMP Index | Nexthop Index(s) | Size |
| 1 | A | 2 |
| 2 | C | 1 |

FIG. 11L

LOAD BALANCING ON MULTI-CHIP NETWORK SWITCH WITHOUT FULL BI-SECTION BANDWIDTH

CROSS-REFERENCE TO RELATED APPLICATIONS

This application is a divisional application of U.S. patent application Ser. No. 15/233,529, filed on Aug. 10, 2016, and entitled: "LOAD BALANCING ON MULIT-CHIP NETWORK SWITCH WITHOUT FULL BI-SECTION BANDWIDTH." Accordingly, this application claims benefit of U.S. patent application Ser. No. 15/233,529 under 35 U.S.C. § 120. U.S. patent application Ser. No. 15/233,529 is here by incorporated by reference in its entirety.

BACKGROUND

Network infrastructure such as routers or switches may receive packets and forward them to facilitate network communications. The network infrastructure may include a number of ports and each port may provide an operable connection to another piece of network infrastructure. The network infrastructure forwards packets across the network by the operable connections between each piece of network infrastructure.

SUMMARY

In one aspect, a network device in accordance with embodiments of the invention includes a first network processor that forwards packets based on a first forwarding information table; a second network processor that forwards packets based on a second forwarding information table; a first plurality of ports operably connected to the first network processor; and a second plurality of ports operably connected to the second network processor. The first forwarding information table specifies that packets, received by the first network processor, that specify a destination device reachable by the first plurality of ports and the second plurality of ports are forwarded by a port of the first plurality of ports. The second forwarding information table specifies that packets, received by the second network processor, that specify the destination device reachable by the first plurality of ports and the second plurality of ports are forwarded by a port of the second plurality of ports.

In one aspect, a method of operating a network processor (NP) in accordance with embodiments of the invention includes obtaining, by the NP of a network device, a packet; determining, by the NP, a multipath table index from a forwarding table associated with the NP; identifying, by the NP, a multipath group specified in an entry of a multipath table associated with the NP using the multipath table index; selecting, by the NP, a nexthop index from a plurality of nexthop indexes specified by the multipath group; obtaining, by the NP, a port and a media access control (MAC) address from a nexthop table entry using the nexthop indexes; and transmitting, by the NP, the packet via the port to a second network device using the MAC address.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 10A shows a second example network topology in accordance with embodiments of the invention.

FIG. 10B shows a second example forwarding table in accordance with one or more embodiments of the invention.

FIG. 10C shows a second example nexthop table in accordance with one or more embodiments of the invention.

FIG. 10D shows a third example multipath table associated with a first network processor in accordance with one or more embodiments of the invention.

FIG. 10E shows a fourth example multipath table associated with a second network processor in accordance with one or more embodiments of the invention.

FIG. 11C shows a third example nexthop table in accordance with one or more embodiments of the invention.

FIG. 11D shows a fifth example multipath table associated with a first network processor in accordance with one or more embodiments of the invention.

FIG. 11E shows a sixth example multipath table associated with a second network processor in accordance with one or more embodiments of the invention.

FIG. 11F shows a fourth example nexthop table associated with a first network processor in accordance with one or more embodiments of the invention.

FIG. 11G shows a fifth example nexthop table associated with a second network processor in accordance with one or more embodiments of the invention.

FIG. 11H shows a seventh example multipath that is shared by more than one network processor in accordance with one or more embodiments of the invention.

FIG. 11I shows a sixth example nexthop table associated with a first network processor in accordance with one or more embodiments of the invention.

FIG. 11J shows a seventh example nexthop table associated with a second network processor in accordance with one or more embodiments of the invention.

FIG. 11K shows an eighth example multipath table associated with a first network processor in accordance with one or more embodiments of the invention.

FIG. 11L shows a ninth example multipath table associated with a second network processor in accordance with one or more embodiments of the invention.

DETAILED DESCRIPTION

Figure 1:
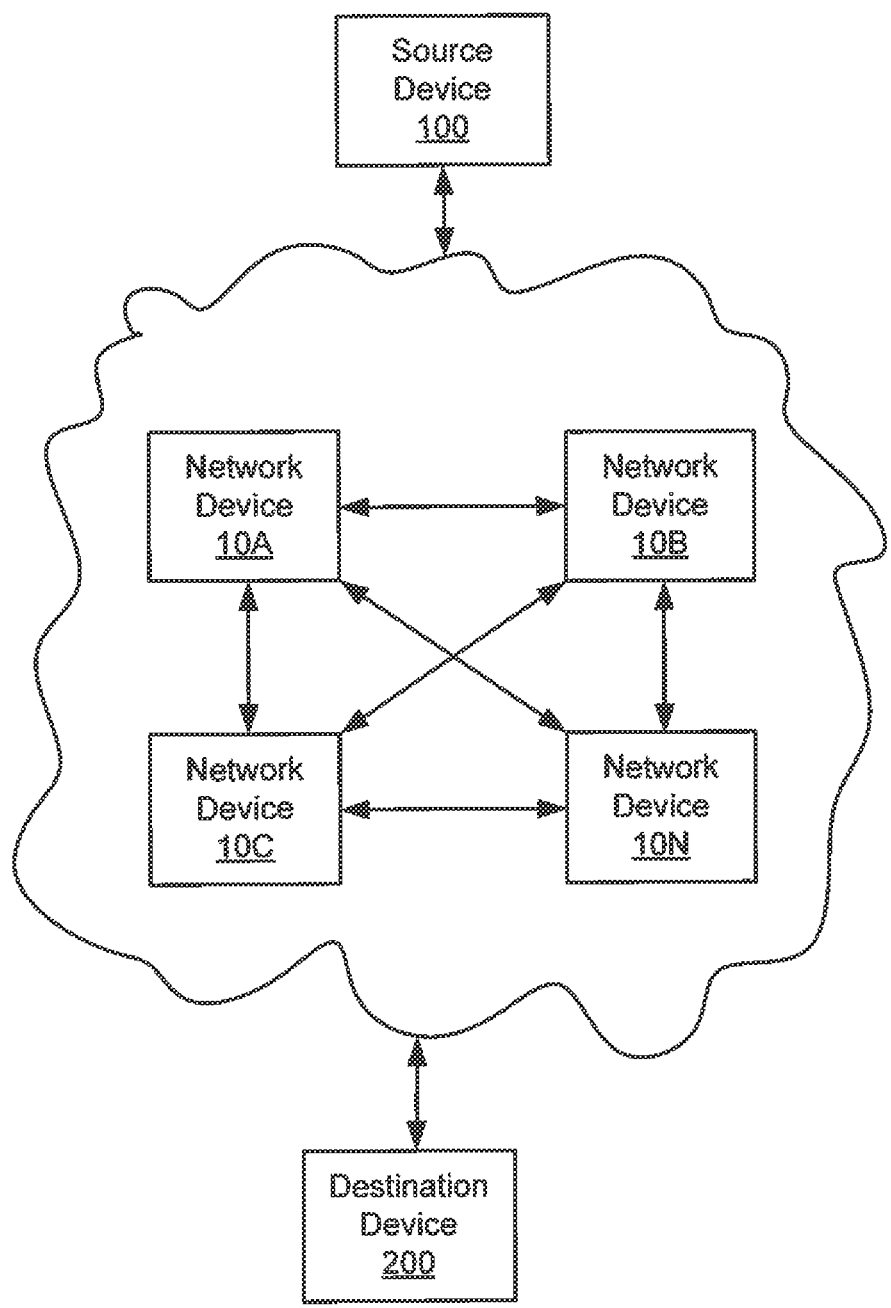
FIG. 1 shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for performing packet forwarding by a network device. The network device may be a router, switch, multilayer switch, or other device that may support network communications. To support network communications, the network device may be configured to receive packets, identify a recipient of the packets, and forward the received packets towards the identified recipient.

The network device may include multiple network processors. Each network processor may include ingress ports for receiving packets and egress ports for sending packets. Each of the ingress and egress ports may be connected to separate operable connections between the network device and other network infrastructure components such as, for example, servers, routers, switches, or other devices. Additionally, each of the network processors ma y be connected to each other by an additional operable connection and thereby enable packets received by a first network processor to be sent to an egress port of a second network processor for forwarding by way of the additional operable connection with the second network processor.

Embodiments of the invention may improve packet forwarding efficiency by preferentially forwarding packets without utilizing the operable connection. In other words, packets that are received by a network processor are preferentially forwarded via ports that are directly connected to the network processor. In some cases it may not be possible to forward packets via only ports that are directly connected to the network processor and in such cases the packets may be forwarded to another network processor via the operable connection. For example, the topology of the network to which a network processor is connected may limit to which recipients the network processor may forward packets via ports that are directly connected to the network processor.

Further embodiments of the invention may provide improvements in packet forwarding efficiency by divergently programming forwarding tables utilized by each of the network processors to forward packets. Additionally embodiments of the invention may reduce the computing and storage resources required for divergent programming of the forwarding tables by minimizing the divergence.

Each of the network processors may perform packet forwarding based on its own forwarding information tables. In some embodiments of the invention, network processors may share components of a forwarding information table. Each forwarding information table may include information to determine the next hop of a to-be-forwarded packet. Components of a shared forwarding information table may be shared by copying portions of the shared forwarding information table to memory of multiple network processors. By resolving the next hop, an egress port for the packet may be determined. The egress port may be a local egress port, i.e., a port of the network processor that received the packet, or a foreign egress port, i.e., a port of a network processor that did not receive the packet.

Each forwarding information table may include a forwarding table, a nexthop table, and a multipath table. As will be discussed in greater detail below, nexthop tables and multipath tables may be programmed to cause each of the network processors to preferentially forward packets via local egress ports rather than foreign egress ports. However, when a local egress port is not available, the nexthop table and multipath table may be programmed to cause the network processors to forward packets via foreign egress ports. Forwarding packets via local egress ports may reduce inter network processor traffic.

In one or more embodiments of the invention, the network device may include a forwarding information optimizer. The forwarding information optimizer may generate, modify, and/or remove information included in the forwarding information tables and thereby modify the packet forwarding behavior of the network processors.

FIG. 1 shows an example of a network in accordance with one or more embodiments of the invention. The example network shown in FIG. 1 includes a source device (100), a destination device (200), and network devices (10A-10N). Each of the aforementioned devices may be interconnected by a communication network supporting one or more networking protocols. For example, network device 10A may be connected by operable communications links to network devices 10B, 10C, and 10N as indicated by the arrows. The network may include any number of source devices, destination devices, and network devices without departing from the invention. Additionally, each of the aforementioned devices may include any number of communication links without departing from the invention. In one embodiment of the invention, the network may be the Internet, a wide area network, a local area network, or any other type of connection.

In one or more embodiments of the invention, a source device (100) may communicate with a destination device (200) using one or more networking protocols. The source and destination devices may be, for example, servers. More specifically, the source device (100) may generate a packet that identifies the destination device (200) and send the packet to one of the network devices (10A-10N). Upon receipt of the packet, the network device (10A-10N) may determine a communication link on which to forward the packet based on the information included in a forwarding table (not shown) of the network device (10A-10N).

For example, network device 10A may receive the packet from the source device. Network device 10A may include three communication links to network devices 10B, 10C, and 10N, respectively. Network device 10A may determine to which of network devices 10B, 10C, and 10N to forward the packet based on the destination device (200) identified by the packet and the information included in the forwarding table.

Figure 2:
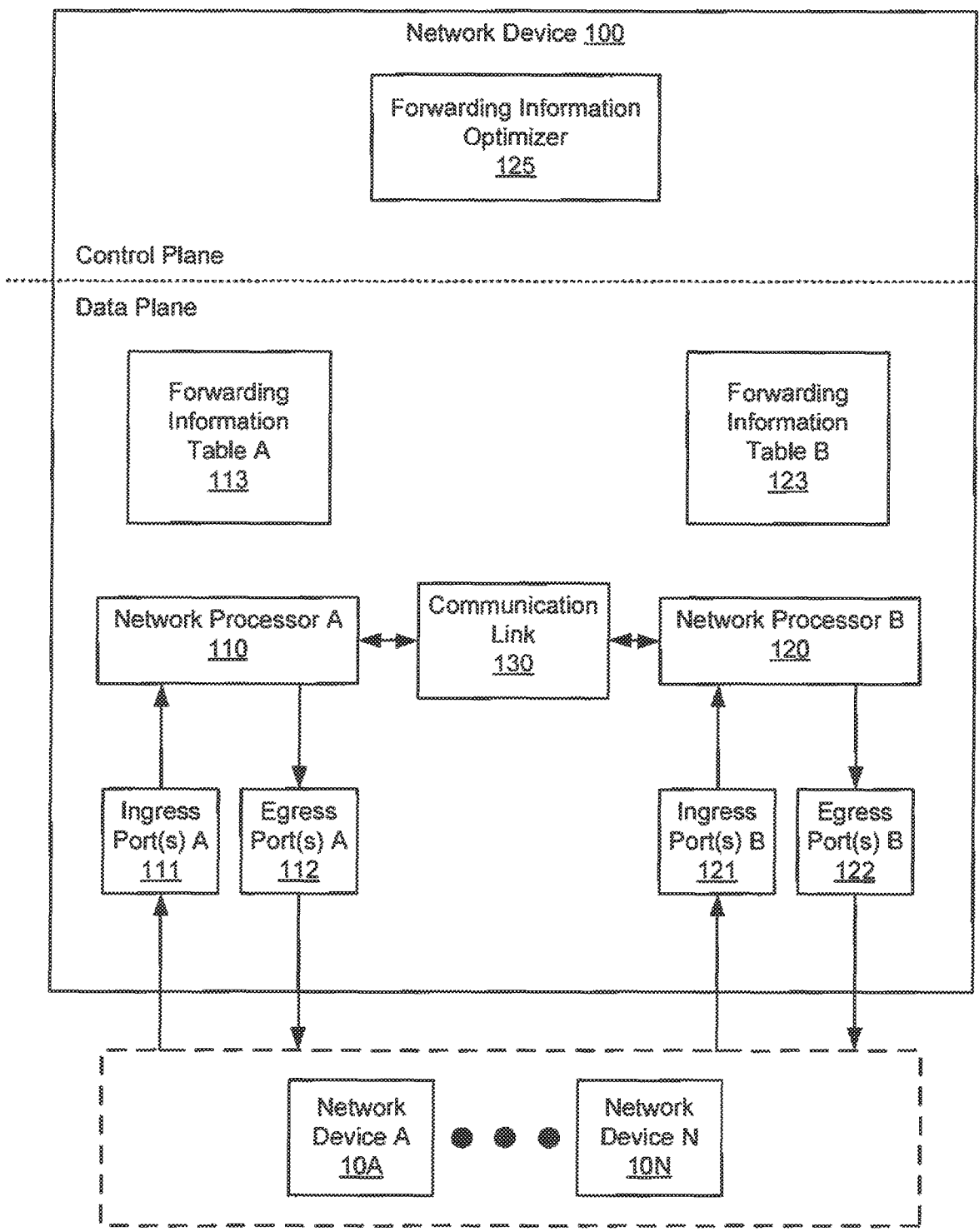
FIG. 2 shows a network device in accordance with one or more embodiments of the invention.

FIG. 2 shows a network device (100) in accordance with one or more embodiments of the invention. The network device (100) may be configured to receive and forward packets in accordance with one or more networking protocols.

The network device (100) may be a physical device that includes non-transitory storage, memory (e.g. Random Access Memory), and one or more processors. The non-transitory storage may include instructions, which when executed by the one or more processors enable the network device (100) to perform all or a portion of the functions described in this application and shown in FIGS. 7-8.

The network device (100) may include a first network processor A (110), operably connected to a network by local ingress ports A (111) and local egress ports A (112), that performs packet forwarding based on information included in forwarding information table A (113). The network device may include a second network processor B (120), operably connected to a network by local ingress ports B (121) and local egress ports B (122), that performs packet forwarding based on information included in a forwarding information table B (123). Each of the network processors may be connected to each other by a communication link (130). The network device may further include a forwarding information optimizer (125). Each of the components of the network device (100) is described below.

While the ports are illustrated in FIG. 2 as being ingress or egress ports, bidirectional ports may be used without departing from the invention. In other words, each of the local ingress ports A (111) and local egress ports A (112) may actually bidirectional. In FIG. 2, the ports are labeled as ingress and egress merely to simplify the diagrammatic representation and description of the network device.

In one or more embodiments of the invention, the network processor A (110) may be a physical device that includes functionality to enable the network device to communicate with other devices (e.g., other network devices, source devices, and/or destination devices) using one or more networking protocols. The network processor A (110) may be configured to receive packets from one or more other network devices by operable connections through ingress port(s) A (111) and forward the received packets to other components of the network device (100). Further, the network processor A (110) may be configured to receive packets from components of the network device (100) and forward the packets to one or more devices by way of egress port(s) A (112) and/or egress ports B (122). Additionally, the network processor A (110) may be configured to receive packets from other network devices by way of ingress port(s) A (111) and forward the received packets to other network devices by way of egress port(s) A (112) and/or egress port(s) B (122).

The network processor A (110) may be, for example, an embedded hardware device. For example, the embedded hardware device may be a field programmable gate array (FPGA), application specific integrated circuit (ASIC), and/or digital signal processor (DSP).

In one or more embodiments of the invention, the network processor B (120) may be configured to identify packets received from network devices that are to be forwarded to other devices based on information included in the forwarding information table B (123). Upon identification of a to-be-forwarded packet, the network processor B (120) may retrieve, from the forwarding information table B (123), information that determines the next hop for the packet and thereby identifies an egress port and a Media Access Control (MAC) address of a device to which the to-be-forwarded packet is to be sent.

In one or more embodiments of the invention, the network processor B (120) may be a physical device that includes functionality to enable the network device to communicate with other devices (e.g., other network devices, source devices, and/or destination devices) using one or more networking protocols. The network processor B (120) may be configured to receive packets from one or more devices by way of ingress port(s) B (111) and forward the received packets to other components of the network device (100). Further, the network processor B (120) may be configured to receive packets from components of the network device (100) and forward the packets to one or more devices by way of egress ports B (122) and/or egress ports A (112). Additionally, the network processor B (120) may be configured to receive packets from other network devices by way of ingress ports B (121) and forward the received packets to other network devices by way of egress ports B (122) and/or egress ports A (112).

The network processor B (120) may be, for example, an embedded hardware device. For example, the embedded hardware device may be a field programmable gate array (FPGA), application specific integrated circuit (ASIC), and/or digital signal processor (DSP).

To enable the network device (100) to perform packet forwarding, the network device may include a first forwarding information table A (113) and a second forwarding information table B (123). The forwarding information tables may be stored on the network device. For example, the forwarding information tables may be stored in a memory of the network device. The memory may be, for example, a hard disk drive, a solid state drive, random access memory, or any other type of physical device or storage circuit for storing information.

The forwarding information tables may be data structures that include information related to the topology of a network. Each of the forwarding information tables may include a forwarding table, a nexthop table, and a multipath table. Each of the forwarding table, nexthop table, and multipath tables may be programmed to configure the packet forwarding behavior of each of the network processors.

In one or more embodiments of the invention, the forwarding information tables, or copies of the tables, may be stored in the network processor A (110) and the network processor B (120) respectively. For example, each of the network processors may include a memory. The forwarding table, nexthop table, and multipath table associated with each processor may be stored in the memory of that processor.

In some embodiments of the invention, the nexthop table and/or the multipath table of at least two forwarding information tables may be identical. In other embodiments of the invention, the nexthop table and/or the multipath table of each of the forwarding information tables may be different. When a nexthop table and/or multipath table of at least two forwarding information tables are identical, a single nexthop table and/or multipath table may be shared by at least two network processors and thereby reduce the amount of memory required to store the forwarding information tables. In some embodiments of the invention, duplicate copies of a shared table may be stored in each network processor. For example, a first network processor may have a multipath table that is shared with a second network processor. The forwarding information optimizer (125) may generate a shared multipath table in a memory of the network device (100). The duplicate copies of the shared multipath table may be stored in the memories of the first network processor and the second network processor, respectively.

The forwarding information tables are further described with reference to forwarding information table A (113). Forwarding information Table B (123) may include tables that have a similar structure but contain, at least in part, different information.

Figure 3:
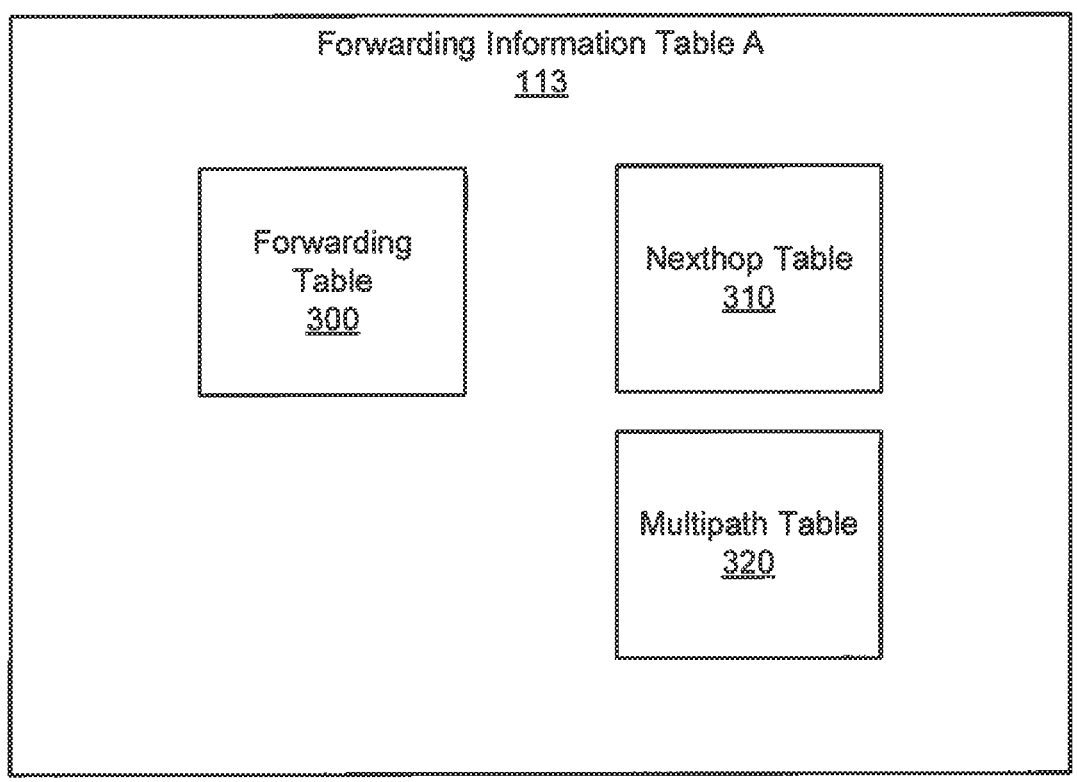
FIG. 3 shows a forwarding information table in accordance with one or more embodiments of the invention.

FIG. 3 shows a diagram of forwarding information table A (113) in accordance with one or more embodiments of the invention. Forwarding information table A (113) may include a forwarding table (300), a nexthop table (310), and a multipath table (320). Each of these components is described below.

While in the following description of the forwarding table (300), the nexthop table (310), and the multipath table (320), each are described as separate data structures, embodiments of the invention are not limited to separate implementations of each table. Any of the aforementioned data structures may be integrated together, collapse, or otherwise reduced to a fewer number of tables without departing from the invention. For example, as will be discussed in greater detail below, entries of the multipath table may be integrated into entries of the nexthop table so that only a combined nexthop/multipath table may exist on the network device. Similarly, entries of the nexthop/multipath table may be integrated into the forwarding table so that only a combined forwarding table/nexthop/multipath table may exist on the network device.

Figure 4:
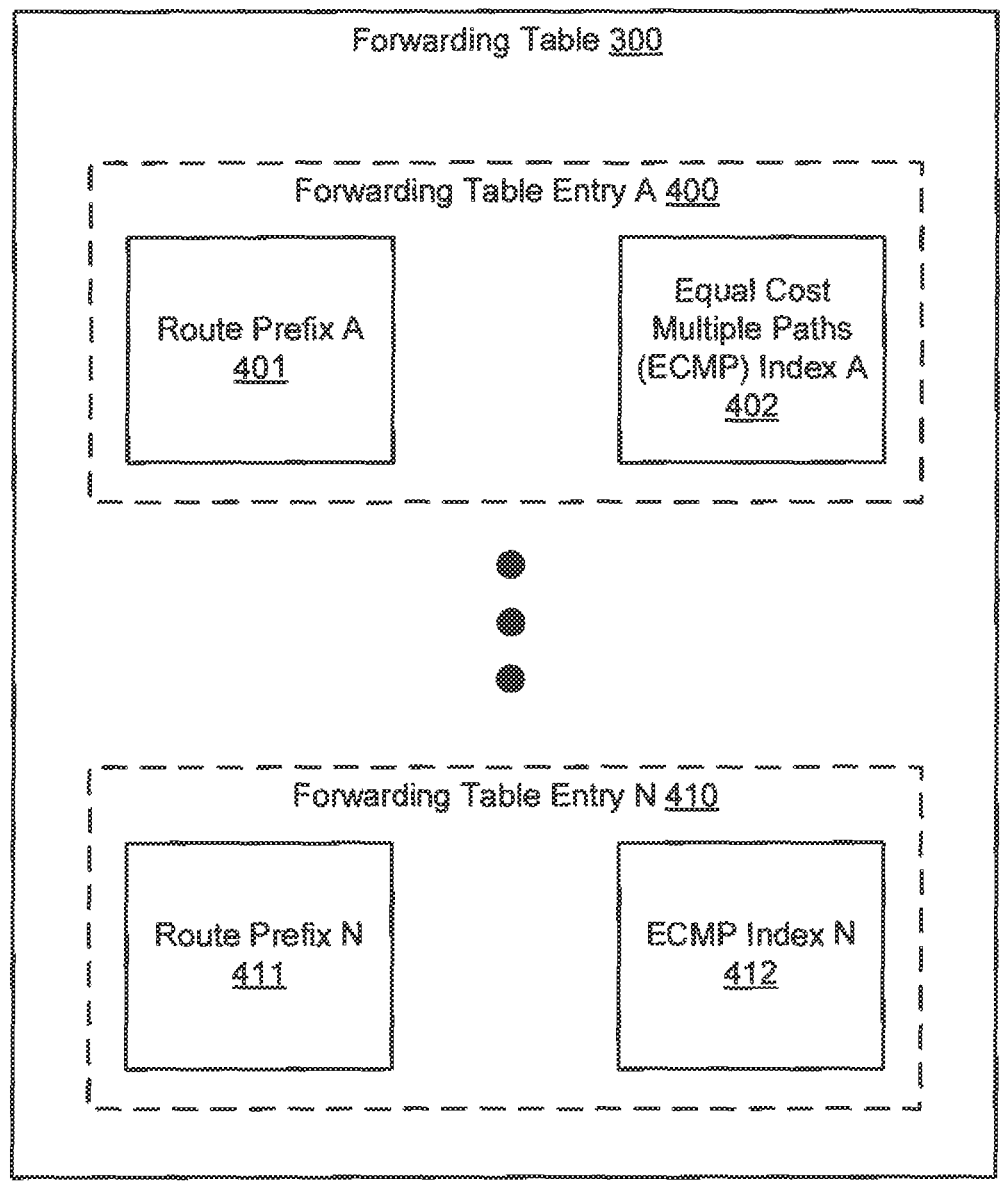
FIG. 4 shows a forwarding table in accordance with one or more embodiments of the invention.

In one embodiment of the invention, the forwarding table (300) is a data structure that includes information used to determine the next-hop of any to-be-forwarded packet. FIG. 4 shows a diagram of a forwarding table (300) in accordance with one or more embodiments of the invention. The forwarding table (300) may include a number of entries (400, 410). Each of the entries (400, 410) may include a route prefix (401, 411) and a multipath index (402, 412). A destination address of the packet, a portion of a header of the packet, or any other portion of the packet that may enable the network device to determine a destination device associated with the packet. The destination may be used with any method, such as a longest prefix match method, to determine a route prefix for the packet. Other methods of determining a routing prefix for the packet may be used without departing from the invention. The determined route prefix for the packet may be matched to one of the route prefixes (401, 411) specified by one of the forwarding table entries (400, 410) to obtain a multipath index (402, 412) for the packet. The multipath index may be an index of a multipath table. As will be discussed in greater detail below, the multipath index may be used by a network processor to identify a multipath group and, in turn, a nexthop index. The identified entry of the nexthop table and/or the identified entry of the multipath table may be used to forward the packet.

In one or more embodiments of the invention, the entries (400, 410) of the forwarding table may specify multipath groups, e.g., may specify an entry of a multipath table that specifies a multipath group. Specifically, the entries (400, 410) of the forwarding table may specify an entry of a multipath table that specifies entries of a nexthop table. Each entry of the nexthop table specified by the multipath table entry may define members of the multipath group specified by the multipath table entry.

In one or more embodiments of the invention, the entries (400, 410) of the forwarding table may specify multipath groups or nexthop table entries. Specifically, each forwarding table entry (400, 410) may specify a multipath group or a nexthop table entry. For example, a first forwarding table entry may specify an entry of the nexthop table and a second forwarding table entry may specify a multipath group, e.g., an entry of a multipath table. As will be discussed below, the network device may determine a next hop for a packet based on a nexthop table entry or a multipath group. For example, a nexthop table entry may explicitly specify a next hop while a multipath group may specify a number of next hops and a next hop for the packet may be assigned by randomly, semi-randomly, deterministically, or otherwise selecting a next hop of the next hops specified by the multipath group. For example, a next hop specified by the multipath group may be determined by a hashing which is discussed in greater detail below.

Returning to FIG. 3, the nexthop table (310) may be a data structure that specifies, directly or indirectly, egress information for packets that are to be forwarded by the network device. The nexthop table (310) may be used in conjunction with the multipath table (320) to configure the forwarding behavior of a network processor. The egress information specified by each table of the nexthop table (310) may be used to determine the next hop of a to-be-forwarded packet. In some embodiments of the invention, the nexthop table (310) may include egress information used to determine the next hop of a to-be-forwarded packet. In other embodiments of the invention, the nexthop table (310) may specify the location of a data structure that includes egress information used to determine the next hop of a to-be-forwarded packet. The data structure may be, for example, a table, list, or memory location. The nexthop table (310) may specify the location of the data structure by, for example, including pointers to elements of the data structure.

Figure 5:
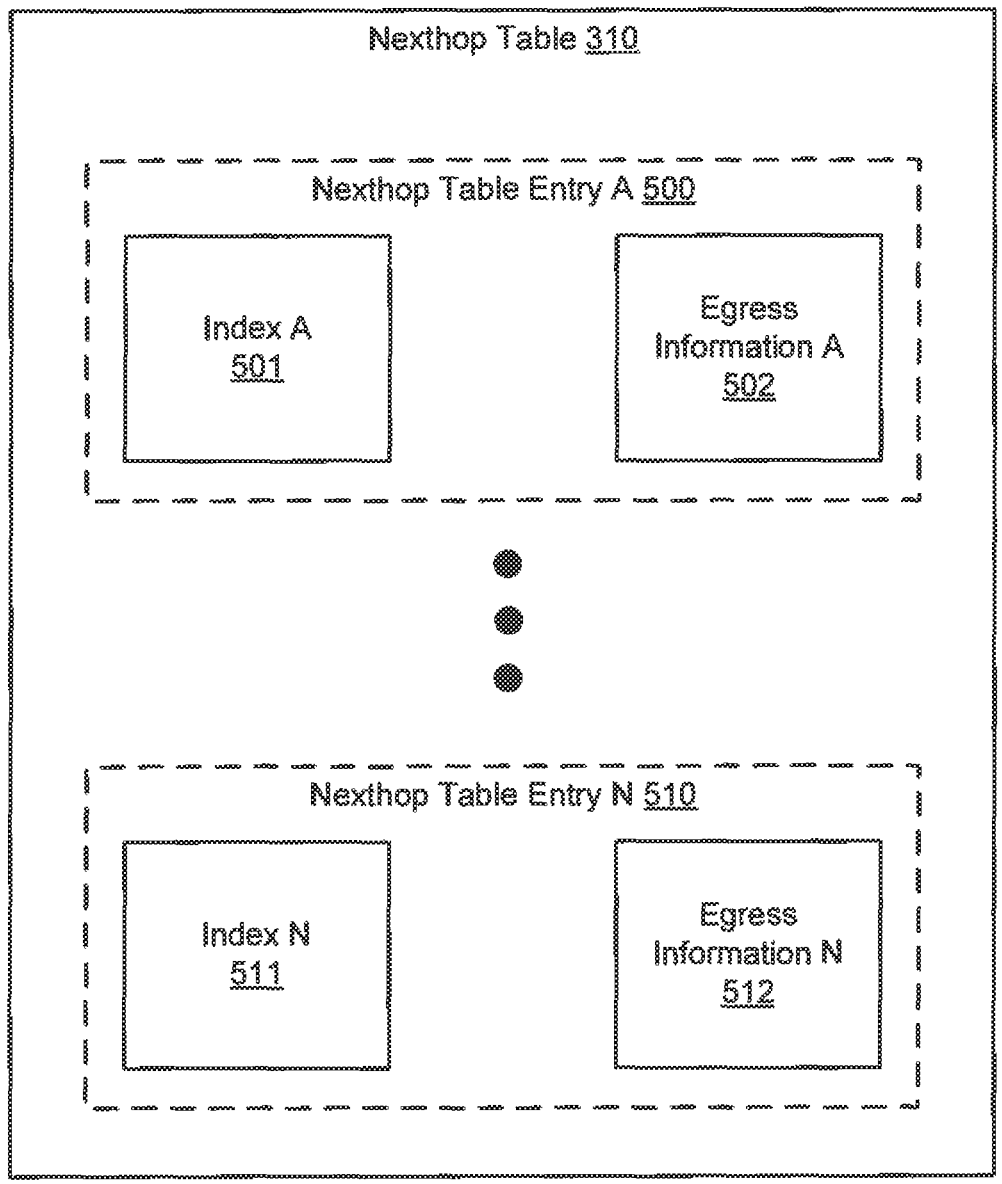
FIG. 5 shows a nexthop table in accordance with one or more embodiments of the invention.

The egress information may be an egress port and a MAC address of a network device that is reachable by an operable connection of the egress port. FIG. 5 shows a diagram of a nexthop table (310) in accordance with one or more embodiments of the invention. The nexthop table (310) may include a number of entries (500, 510). Each of the entries (500, 501) may have an index (501, 511) and include egress information associated with the index. For example, nexthop table entry A (500) has an index A (501) and includes an egress information A (502). The index may be a value or other identifier that uniquely identifies the nexthop table entry. In some embodiments, the egress information A (502) may specify an interface and/or Media Access Address (MAC) address. The interface may be an egress port of the network device. The MAC address may be the address of another network device reachable by the operable connection associated with the egress port. In other embodiments, the egress information A (502) may include an index to another data structure that specifies an interface and/or Media Access Address (MAC) address.

In one or more embodiments of the invention, multiple entries of the nexthop table may correspond to a multipath group, as will be discussed in greater detail with respect to FIGS. 6A-6C. Each of the entries of the nexthop table corresponding to a multipath group may have an equal path cost. An equal path cost may be a value that represents the relative difficulty of transmitting a packet towards a destination via a path. Entries of the nexthop table that have equal path costs may be predetermined or provided to the network device by a user or obtained by the network device from another entity.

In a first embodiment, each multipath group may be assumed to have an identical, predetermined size. The predetermined size may be the total number of egress ports, local or foreign, by which a packet may be forwarded to determine a next hop. A number of nexthop table entries corresponding to the predetermined size may be programmed based on the next hops specified by the multipath group members corresponding only to the local ports of one network processor. If there are fewer next hops of a multipath group that specify local ports of a network processor, multiple nexthop table entries may be programmed to correspond to each next hop of the multipath group that specifies a local port of the network processor.

For example, a multipath group may include members 1, 2, 3, 4, and 5, of which only members 1 and 3 specify ports that are local to a network processor. Based on the multipath group, A nexthop table may be programmed to include 5 entries that specify next hops of 1, 3, 1, 3, and 1, respectively.

In the first embodiment, each forwarding information table includes an identical multipath table and thereby a single multipath table may be shared by multiple network processors. In some embodiments of the invention, duplicate copies of the shared multipath table may be stored on each of the multiple network processors.

In a second embodiment, each multipath group may be assumed to have a different, predetermined size. The predetermined size may be the total number of local egress ports by which a packet may be forwarded to determine a next hop. Each multipath group and multipath group size may be specified by an entry of a multipath table. A number of nexthop table entries corresponding to the predetermined size may be programmed based on the next hops specified by the multipath group members. Each of the number of consecutive nexthop table entries may be programmed to correspond to a next hop of the multipath group.

For example, a multipath group may include members 1, 2, and 3. Each of the members specify ports that are local to a network processor. Based on the multipath group, a nexthop table may be programmed to include 3 entries that specify next hops of 1, 2, and 3, respectively. In another example, the multipath group may include members 1, 2, 3, 4, and 5. Each of members 1, 2, and 3 may specify ports that are local to a first network processor and members 4 and 5 may specify ports that are local to a second network processor. A nexthop table of the first network processor may be programmed so that packets received by the first network processor are forwarded via ports that are local to the first network processor and a nexthop table of the second network processor may be programmed so that packets received by the second network processor are forwarded via ports that are local to the second network processor.

In a third embodiment, each multipath group may be assumed to have a different, predetermined size and each multipath table may be assumed to specify an offset corresponding to a multipath group. The predetermined size may be the total number of local egress ports by which a packet may be forwarded to determine a next hop. Each multipath group, multipath group size, and multipath group offset may be specified by an entry of a multipath table. A number of nexthop table entries corresponding to the total number of local and foreign egress ports may be programmed based on the local and foreign egress ports.

In some embodiments, the multipath group members and multipath group offset may be combined into a single elements that specifies a nexthop table index. The nexthop table index may specify the start of a block of nexthop table indexes. Each of the nexthop table indexes of the block of nexthop table indexes may specify members of a multipath group. The multipath group offset may be incorporated into the single element by incrementing the nexthop table index of the start of the block of nexthop table indexes. Thus, nexthop table indexes for multiple network processors may be programmed identically while enabling packets to be preferentially forwarded via local ports by programming the start of the block of nexthop indexes differently in each of the network processors.

For example, a multipath group may include members 1, 2, and 3. Each of the members specify ports that are local to a network processor. However, there may also be additional next hops 4 and 5 that specify ports that are foreign to the network processor. Based on the next hops 1, 2, and 3 specified by the multipath group and the next hops 4 and 5 that are not specified by the multipath group, a nexthop table may be programmed to include 5 entries that specify next hops of 1, 2, 3, 4, and 5, respectively. A multipath group for the network processor may be programmed to specify the nexthop index of the nexthop table element including the next hop of "1" and a size of 3. A second multipath group for a second network processor may be programmed to specify the nexthop index of the nexthop table element including the nexthop table element including the next hop of "4" and a size of 2. Thus, the multipath group of the first network processor specifies next hops 1, 2, and 3 while the second multipath group of the second network processor specifies next hops of 4 and 5.

In the third embodiment, each forwarding information table includes an identical nexthop table and thereby a single nexthop table may be shared by multiple network processors. In some embodiments, duplicate copies of a shared nexthop table may be stored on each network processor.

Returning to FIG. 5, each of the egress information (502, 512) of each nexthop table entry (500, 510), respectively, may include information similar to that of the egress information A (502) and thereby enable the network device to determine the next hop of any to-be-forwarded packet.

Returning to FIG. 3, the multipath table (320) may be a data structure that includes information relating to one or more next hops that have an equal cost. The multipath table (320) may be used by a network processor to distribute packet forwarding over multiple next hops to improve performance of the network. The multipath table (320) may be programmed, in conjunction with the nexthop table (310), to configure the forwarding behavior of a network processor. FIGS. 6A-6C show embodiments of the multipath table (320).

Figure 6A:
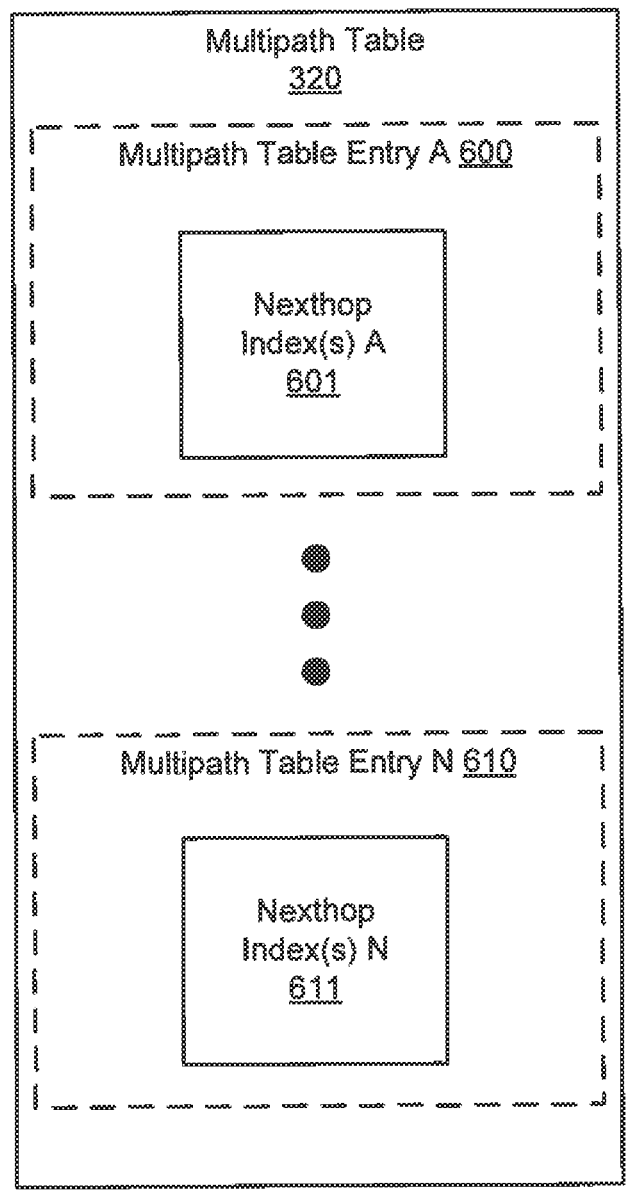
FIG. 6A shows a first multipath table in accordance with one or more embodiments of the invention.

FIG. 6A shows a diagram of an example of a first embodiment of the multipath table (320). The first embodiment of the multipath table (320) includes multiple entries (600, 610). Each of the entries (600, 610) specifies one or more nexthop indexes (601, 611) and thereby defines a multipath group comprising next hops that all have the same cost. The cost of each next hop may be predetermined or acquired by any method without departing from the invention. In one or more embodiments of the invention, each multipath table entry may have an index that identifies the entry and thereby an entry of the multipath table may be identified using a multipath table index specified by an entry of the forwarding table. In some embodiments, nexthop table entries that specify members of a multipath group are assumed to be programmed in contiguous blocks of nexthop table entries. Thus, a multipath group may be specified by a single nexthop table index and an assumed group size.

Multipath groups may specify different information depending on how the multipath group is used, in conjunction with or separately from the forwarding table and nexthop table, to determine a next hop of the packet. The following embodiments describe information included in each multipath table entry used to identify next hops.

In a first embodiment, it is assumed that all multipath groups have a predetermined, identical group size and that all members of the multipath group are listed in consecutive nexthop table entries. Thus, each of the entries (600, 610) of the multipath table (320) specifies an index of a nexthop table and the multipath group is specified by the index and the predetermined group size. For example, a first entry of a multipath table may specify a nexthop index of 5 and the predetermined group size may be six. The multipath group specified by the first entry of the multipath table are the nexthop table entries having indexes of 5 through 10. FIG. 6A shows an example of a multipath table in accordance with the first embodiment.

Figure 6B:
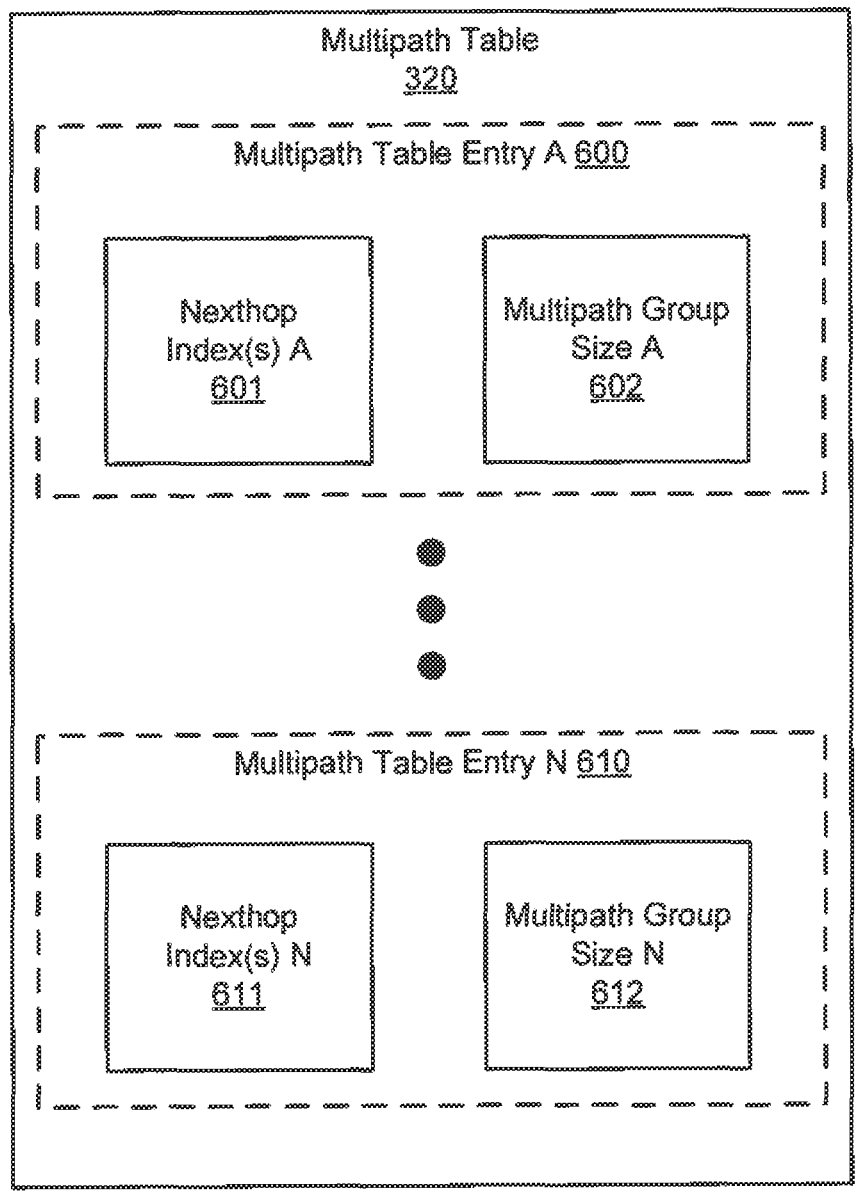
FIG. 6B shows a second multipath table in accordance with one or more embodiments of the invention.

FIG. 6B shows a diagram of an example of a second embodiment of the multipath table (320). The second embodiment of the multipath table (320) includes multiple entries (600, 610). Each of the entries (600, 610) specifies one or more nexthop indexes (601, 611) and a size of each multipath group (602, 612). The nexthop index and size of each multipath group thereby defines a multipath group comprising next hops that all have the same cost. In one or more embodiments of the invention, the size of each multipath group may be the total number of local next hops, e.g., via ports that are local to a network processor, and foreign next hops. e.g., via ports that are foreign to the network processor.

For example, a multipath table may specify two multipath groups. A first entry of a multipath table may specify a nexthop index of 2 and multipath group size of 4. The multipath group specified by the first entry of the multipath table are the nexthop table entries having indexes of 2 through 5. A second entry of the multipath table may specify a nexthop index of 7 and a group size of 3. The multipath group specified by the second entry of the multipath table are the nexthop table entries having indexes of 7 through 9.

Figure 6C:
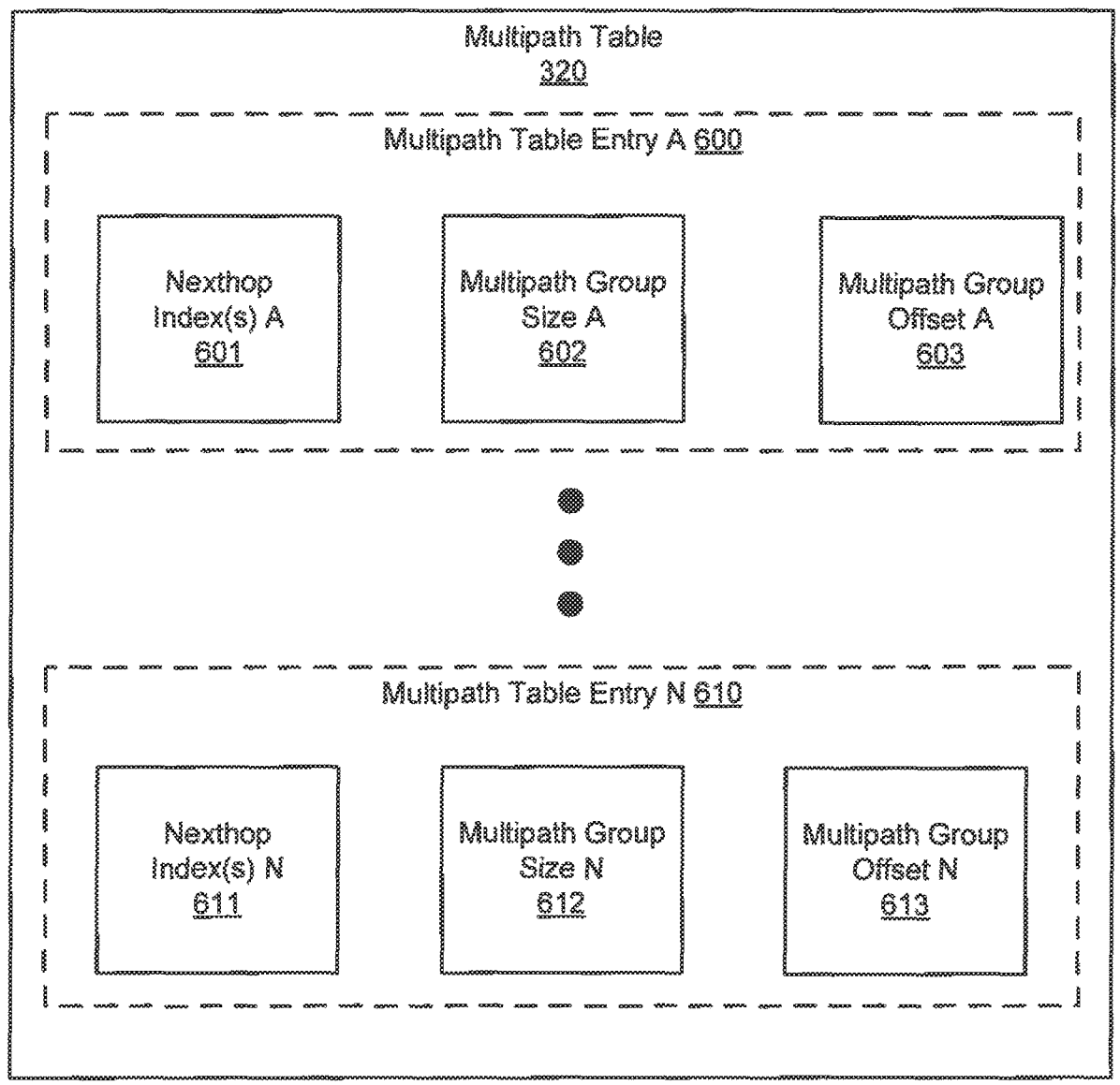
FIG. 6C shows a third multipath table in accordance with one or more embodiments of the invention.

FIG. 6C shows a diagram of an example of a third embodiment of the multipath table (320). The third embodiment of the multipath table (320) includes multiple entries (600, 610). Each of the entries (600, 610) specifies one or more nexthop indexes (601, 611), a size of each multipath group (602, 612), and a multipath group offset (603, 613). The multipath group offset may specify a nexthop index offset or an offset within the members of the multipath group. The nexthop index, size of each multipath group, and offset of each multipath group thereby defines a multipath group comprising next hops that all have the same cost and are associated with a single network processor. As discussed above, the multipath group offset (603) and the nexthop index (601) of each entry may be collapsed into a single element that specifies the same information without departing from the invention.

For example, a multipath table may specify two multipath groups. A first entry of a multipath table may specify a nexthop index of 2, a multipath group size of 2, and a multipath offset of 2. Alternatively, the first entry of the multipath table may specify a nexthop index of 4 and a multipath group size of 2. The multipath group specified by the first entry of the multipath table are the nexthop table entries having indexes of 4 through 5. A second entry of the multipath table may specify a nexthop index of 7, a group size of 6, and an offset of 1. The multipath group specified by the second entry of the multipath table are the nexthop table entries having indexes of 8 through 12.

In one or more embodiments of the invention, each multipath table entry (600, 610) includes a nexthop index (601, 611), a multipath group size (602, 612), and a multipath group offset (603, 613). The nexthop index is an index of a nexthop table of the network device. The multipath group size is a quantity of nexthop table entries that specify next hops having an equal cost. The multipath group offset is an offset from the nexthop index (601, 611). The aforementioned information enable each multipath table entry to specify a group of nexthop table entries having an equal cost.

Returning to FIG. 2, each table of the forwarding information table A (113) and forwarding information table B (123) may be programmed by the forwarding information optimizer (FIO) (125). The FIO (125) may be executing on the network device (100) as shown in FIG. 2. The FIO (125) may be executing on a device that is external to the network device without departing from the invention.

Figure 7:
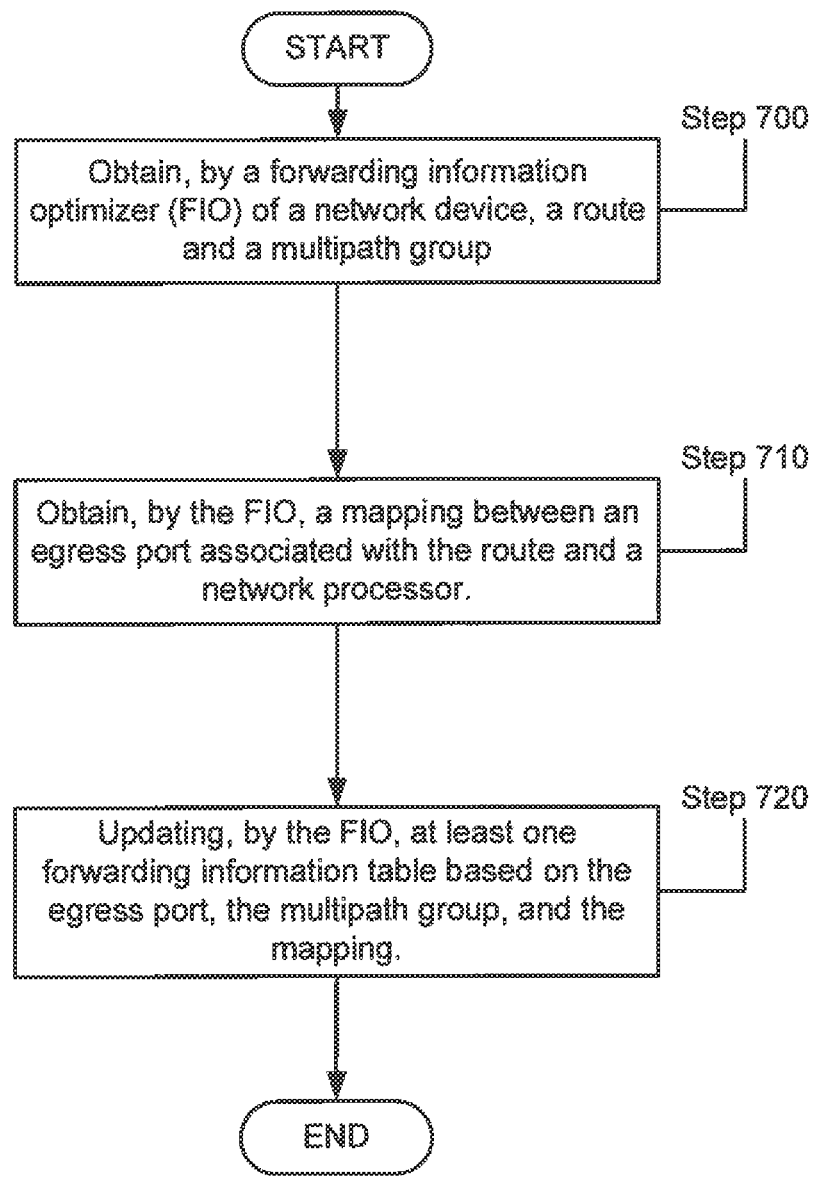
FIG. 7 shows a flowchart of a method of programming a forwarding information table in accordance with one or more embodiments of the invention.

In one embodiment of the invention, the FIO (125) may be configured to program entries of a nexthop table and a multipath table of each of the forwarding information tables (113, 123). More specifically, the FIO (125) may be configured to generate entries of a nexthop table and a multipath table based on changes to a network topology. For example, due to changes in network topology, another network device that was reachable by way of one of the egress ports (112, 122) may become unreachable. In another example, a new additional network device may become reachable from one of the egress ports (112, 122). The FIO (125) may include functionality to implement the methods of programming a nexthop table and a multipath table as shown in FIG. 7. The methods may include modifying nexthop table entries and multipath table entries to minimize storage requirements while still maintaining proper forwarding behavior to prevent loss or degradation of network traffic.

In some embodiments of the invention, copies of the nexthop table and multipath table may be stored in each of the network processors (110, 120).

Those skilled in the art will appreciate that the invention is not limited to the architecture shown in FIGS. 1-2.

Figure 8:
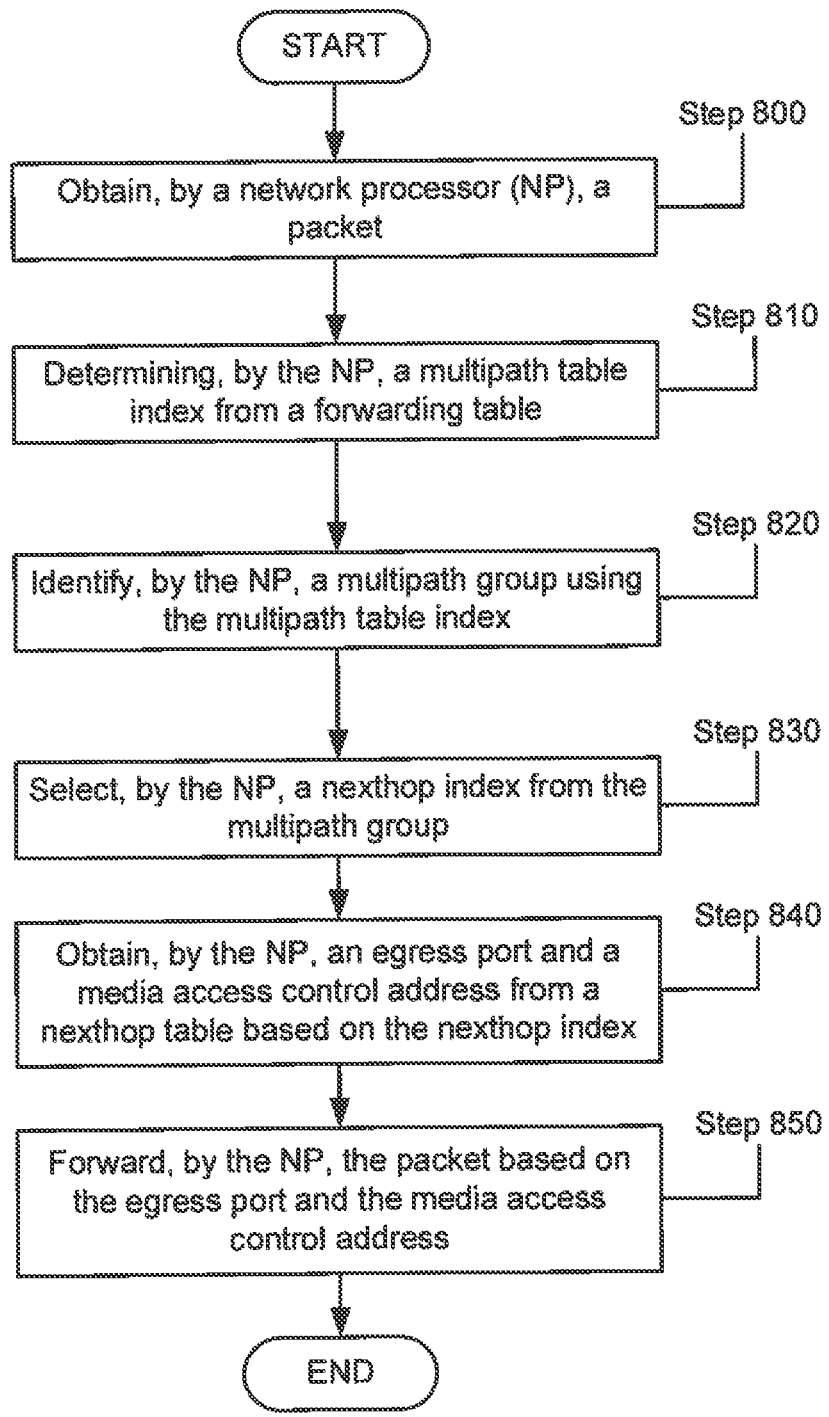
FIG. 8 shows a flowchart of a method of performing packet forwarding in accordance with one or more embodiments of the invention.

In the following flowcharts, functionality of components of the system shown in FIGS. 1-2 will be described. The functionality shown in the following figures may enable, for example, forwarding information tables to be programmed and packets to be forwarded. FIGS. 7-8 show flowcharts of methods that may be performed, for example, by a network device.

FIG. 7 shows a flowchart in accordance with one or more embodiments of the invention. The method depicted in FIG. 7 may be used to update a forwarding information table in accordance with one or more embodiments of the invention. One or more steps shown in FIG. 8 may be omitted, repeated, and/or performed in a different order among different embodiments.

In Step 700, a forwarding information optimizer (FIO) of a network device obtains a route prefix and a multipath group.

In Step 710, the FIO determines a network processor mapping between an egress port associated with the route prefix and a network processor of the network device. As discussed with respect to FIG. 2, a network device may have more than one network processor. Each of the network processors may have a number of local egress ports and foreign egress ports. An egress port of one of the network processors may be determined based on the obtained route prefix. A network processor mapping between the route prefix and network processor may be determined based on the egress port by comparing the egress port to the local egress ports of each network processor.

In one or more embodiments of the invention, the network processor mapping may be predetermined. In other words, each of the egress ports that are local to each network processor may be known and stored on the network device or another location accessible by the network device. For example, the network processor mapping may be a lookup table that specifies a network processor for each egress port and/or specifies local egress ports for each network processor.

In Step 720, the FIO may update at least one forwarding information table based on the egress port, the multipath group, and the network processor mapping.

In a first embodiment, the FIO may update a first nexthop table of a first forwarding information table and a second nexthop table of a second forwarding information to update the at least one forwarding information table. As discussed with respect to FIGS. 5-6C, the nexthop table and/or the multipath table of each forwarding information table may be programmed to configure the forwarding behavior of each network processor. In the first embodiment, the multipath table of the first forwarding information table may be identical to the multipath table of the second forwarding information while the nexthop tables of the first and second forwarding information tables are different. Thus, in the first embodiment, each of the first forwarding information and second forwarding information may share a multipath table to reduce memory usage.

For example, the first nexthop table may include 5 entries that specify egress information {V2, V1, V1, V2, V1} and the second nexthop table may include 5 entries that specify egress information {V3, V5, V4, V4, V3}. Each of V1 through V5 may specify an egress port and a MAC address associated with equal cost next hops towards a destination network device. A shared multipath table may include an entry that specifies the nexthop indexes of the aforementioned entries of the first nexthop table. The aforementioned entries of the second nexthop table may be stored in entries having indexes that are identical to the indexes of the entries of the first nexthop table. Thus, the shared multipath table entry specifies the aforementioned locations of the first nexthop table and the second nexthop table because each of the egress information V1-V2 and V3-V5 are stored in similar locations in each of the nexthop tables.

When a to-be-forwarded packet, that specifies a route prefix associated with the multipath group, is received by the first network processor, the network processor forwards the packet by the egress information V1 or V2. In contrast, when a to-be-forwarded packet, that specifies a route prefix associated with the multipath group, is received by the second network processor, the network processor forwards the packet by the egress information V3, V4, or V5.

When the FIO obtains a new route prefix and a multipath group, the FIO obtains a network processor mapping between an egress port associated with the route prefix and a network processor. For example, the obtained route prefix may have a next hop of V6 and include an egress port A. The egress port may be associated with a first network processor and, thus, the next hop of V6 may be mapped to the first network processor. Based on the network processor mapping, the FIO may update the first nexthop table as {V2, V1, V6, V2, V1}. Thus, when to be forwarded packets are received by the first network processor that specify the route prefix, the packets are forwarded via one of V1, V2, or V6.

When the FIO obtains a to-be-removed route prefix and a multipath group, the FIO obtains a network processor mapping between an egress port associated with the route prefix and a network processor. For example, the obtained route prefix may have a next hop of V2 and include an egress port A. The egress port may be associated with a first network processor and, thus, the next hop of V2 may be mapped to the first network processor. Based on the network processor mapping, the FIO may update the first nexthop table as {V1, V1, V1, V1, V1}. Thus, when to be forwarded packets are received by the first network processor that specify the route prefix, the packets are forwarded via V1.

In a second embodiment, the FIO may update a first nexthop table and a first multipath table of a first forwarding information table or a second nexthop table and a second multipath table of a second forwarding information to update the at least one forwarding information table. As discussed with respect to FIGS. 5-6C, the nexthop table and/or the multipath table of each forwarding information table may be programmed to configure the forwarding behavior of each network processor. In the second embodiment, each table of the first forwarding information table and the second forwarding information table may be different. Additionally, each of the multipath tables may also specify a size of a multipath table in addition to indexes of the nexthop table that are members of the multipath group.

For example, the first nexthop table may include 5 entries that specify egress information {V1, V2} and the first multipath table may have a first entry that specifies {{1, 2}, 2}. In other words, the first entry of the first multipath table may specify nexthop indexes of 1 and 2 and a group size of 2. The second nexthop table may include 3 entries that specify egress information {V3, V4, V5} and the second multipath table may have a first entry that specifies {{1, 2, 3}, 3}. In other words, the first entry of the second multipath table may specify nexthop indexes of 1, 2, and 3 and a group size of 3.

When a to-be-forwarded packet, that specifies a route prefix associated with the multipath group specified by the first entry of the first and second multipath tables, respectively, is received by the first network processor, the network processor forwards the packet by the egress information V1 or V2. In contrast, when a to-be-forwarded packet, that specifies a route prefix associated with the multipath group, is received by the second network processor, the network processor forwards the packet by the egress information V3, V4, or V5.

When the FIO obtains a new route prefix and a multipath group, the FIO obtains a network processor mapping between an egress port associated with the route prefix and a network processor. For example, the obtained route prefix may have a next hop of V6 and include an egress port A. The egress port may be associated with a first network processor and, thus, the next hop of V6 may be mapped to the first network processor. Based on the network processor mapping, the FIO may update the first nexthop table as {V1, V2, V6} and may update the first entry of the first multipath table as {{1, 2, 3}, 3}. Thus, when to be forwarded packets are received by the first network processor that specify the route prefix, the packets are forwarded via one of V1, V2, or V6.

When the FIO obtains a to-be-removed route prefix and a multipath group, the FIO obtains a network processor mapping between an egress port associated with the route prefix and a network processor. For example, the obtained route prefix may have a next hop of V4 and include an egress port A. The egress port may be associated with a second network processor and, thus, the next hop of V4 may be mapped to the second network processor. Based on the network processor mapping, the FIO may update the second nexthop table as {V3, V5} and may update the first entry of the second multipath table as {{1, 2}, 2}. Thus, when to be forwarded packets are received by the first network processor that specify the route prefix, the packets are forwarded via V3 or V5.

In a third embodiment, the FIO may update a first multipath table of a first forwarding information table and a second multipath table of a second forwarding information to update the at least one forwarding information table. As discussed with respect to FIGS. 5-6C, the nexthop table and/or the multipath table of each forwarding information table may be programmed to configure the forwarding behavior of each network processor. In the third embodiment, the nexthop table of the first forwarding information table may be identical to the nexthop table of the second forwarding information while the multipath tables of the first and second forwarding information tables are different. Thus, in the third embodiment, each of the first forwarding information and second forwarding information may share a nexthop table to reduce memory usage. In some embodiments, as discussed above, copies of the nexthop table may be stored in each of the network processors.

For example, the shared nexthop table may include 5 entries that specify egress information {V1, V2, V3, V4, V5}. Each of V1 through V5 may specify an egress port and a MAC address associated with equal cost next hops towards a destination network device. A first multipath table may include an entry that specifies the nexthop indexes of next hops via local ports of the first network processor and a size of the multipath group. The second multipath table may include an entry that specifies the nexthop indexes of next hops via local ports of the second network processor, a size of the multipath group, and an offset. For example, the first multipath table may specify {{1, 2, 3, 4, 5}, 2} and the second multipath table may specify {{1, 2, 3, 4, 5}, 3, 2}. In other words, the second multipath group may specify 3 indexes, a group size of 3, and an offset of 2.

In some embodiments, the offset and nexthop table index of a group of nexthop table entries that are members of the multipath group may be combined into a single element. For example, if a nexthop table includes 5 entries that specify egress information {V1, V2, V3, V4, V5}, a first multipath table entry for a first network processor may specify {1, 2} which specifies a multipath group starting at nexthop table index 1 and including all nexthop table indexes between the starting nexthop table index and the starting nexthop table index+the multipath group size −1, e.g., nexthop indexes of 1-2. A first multipath table entry for a second network processor may specify {3, 3} which specifies a multipath group starting at nexthop table index 3 and including all nexthop table indexes between the starting nexthop table index and the starting nexthop table index+the multipath group size −1, e.g., nexthop indexes of 3-5.

When a to-be-forwarded packet, that specifies a route prefix associated with the multipath group specified by the entry of the first multipath table or the second multipath table, is received by the first network processor, the network processor forwards the packet by the egress information V1 or V2. In contrast, when a to-be-forwarded packet, that specifies a route prefix associated with the multipath group, is received by the second network processor, the network processor forwards the packet by the egress information V3, V4, or V5.

When the FIO obtains a new route prefix and a multipath group, the FIO obtains a network processor mapping between an egress port associated with the route prefix and a network processor. For example, the obtained route prefix may have a next hop of V9 and include an egress port C. The egress port C may be associated with a second network processor and, thus, the next hop of V9 may be mapped to the second network processor. The FIO may update the shared nexthop table as {V1, V2, V3, V4, V5, V9}. Based on the network processor mapping, the FIO may update the second multipath table as {{1, 2, 3, 4, 5, 6}, 4, 2}. Thus, when to be forwarded packets are received by the second network processor that specifies the route prefix, the packets are forwarded via one of V3, V4, V5 or V9.

Alternatively, the FIO may update the second multipath table as {3, 4} if the group offset and nexthop index that specifies the start of a multipath group are combined into a single element.

When the FIO obtains a to-be-removed route prefix and a multipath group, the FIO obtains a network processor mapping between an egress port associated with the route prefix and a network processor. For example, the obtained route prefix may have a next hop of V3 and include an egress port G. The egress port G may be associated with a second network processor and, thus, the next hop of V3 may be mapped to the second network processor. The FIO may update the shared nexthop table as {V1, V2, V4, V5}. Based on the network processor mapping, the FIO may update the second multipath table as {{3, 4}, 2, 2}. Thus, when to be forwarded packets are received by the second network processor that specify the route prefix, the packets are forwarded via V4 or V5.

FIG. 8 shows a flowchart in accordance with one or more embodiments of the invention. The method depicted in FIG. 8 may be used to forward packets in accordance with one or more embodiments of the invention. One or more steps shown in FIG. 8 may be omitted, repeated, and/or performed in a different order among different embodiments.

In Step 800, a network processor (NP) obtains a packet. The packet may be obtained by, for example, receiving the packet from another network device.

In Step 810, the NP determines a multipath table index from a forwarding table. The NP may determine the multipath table index by matching a route prefix derived from the packet to an entry of the forwarding table that specifies a multipath table index. The route prefix may be derived by, for example, performing a longest prefix match process using the packet. Other methods of determining a route prefix may be used without departing from the invention.

In Step 820, the NP identifies a multipath group specified in an entry of a multipath table using the multipath table index. The NP may identify the multipath group by matching the multipath table index to an entry of the multipath table having the multipath table index. The matched entry of the multipath table may specify a multipath group.

In a first embodiment, the entry of the multipath table may specify the group by listing nexthop indexes of entries of a nexthop table that specify members of the multipath group.

In a second embodiment, the entry of the multipath table may specify the group by listing nexthop indexes of entries of a nexthop table and a size of the group. The size of the group may indicate that only a subset of the listed nexthop indexes of entries of the nexthop table specify members of the group.

In a third embodiment, the entry of the multipath table may specify the group by listing nexthop indexes of entries of a nexthop table, a size of the group, and an offset. The size of the group may indicate that only a subset of the listed nexthop indexes of entries of the nexthop table specify members of the group. The offset may specify that the nexthop indexes that specifies entries of the nexthop table that specify members of the group are offset by a set amount. For example, if a multipath table specified {{1, 2, 3, 4, 5}, 2, 3}, the multipath group includes members specified by nexthop table entries having indexes of 4 or 5. In another example, if a multipath table specified {{1, 2, 3, 4, 5}, 4, 1}, the multipath group includes members specified by nexthop table entries having indexes of 2, 3, 4, or 5.

In a further embodiment, the third embodiment may be modified to combine the offset and specified nexthop indexes into a single entry. For example, a multipath table may specify {3, 2}, the multipath group includes members specified by nexthop table entries having indexes of 4 or 5. In another example, if a multipath table specified {2, 4}, the multipath group includes members specified by nexthop table entries having indexes of 2, 3, 4, or 5.

In Step 830, the NP selects a nexthop index from the multipath group. The nexthop index may be selected by randomly, semi-randomly, deterministically, or otherwise select one of the nexthop indexes specified by the multipath group. For example, the nexthop index may be selected by a hashing.

In Step 840, the NP obtains an egress port and a MAC address from the nexthop table based on the nexthop index. For example, the NP may look up a nexthop table entry having an index that matches the nexthop index and obtain the egress port and MAC address specified by the nexthop table entry.

In Step 850, the NP forwards the packet based on the egress port and MAC address. More specifically, the NP may forward the packet by the port specified by the egress port and address the packet to a network device having the MAC address.

While the method illustrated in FIG. 8 assumes that each entry of the forwarding table specifies a multipath table entry, embodiments of the invention are not so limited. For example, each entry of the forwarding table may specify an entry of the nexthop table or a multipath table entry. When the forwarding table specifies a nexthop table entry, steps 820 and 830 may be skipped and the specified nexthop table entry may be used to obtain the egress port and MAC address in step 840. The packet may then be forwarded as described in step 850 without departing from the invention.

Additionally, if the multipath table, nexthop table, and/or forwarding table are integrated into a single data structure, the indexing described in FIG. 8 may be modified in accordance with the integration to perform packet forwarding without departing from the invention. For example, if the data stored in the multipath table is integrated into entries of the nexthop table, the forwarding table may include entries that specify entries of the nexthop table rather than multipath table entries.

Programming forwarding information tables and performing packet forwarding is further described using explanatory examples. The following examples are for explanatory purposes and are not intended to limit the scope of the technology.

EXAMPLE 1

Figures 9A, 9B, 9C, 9D, 9E:
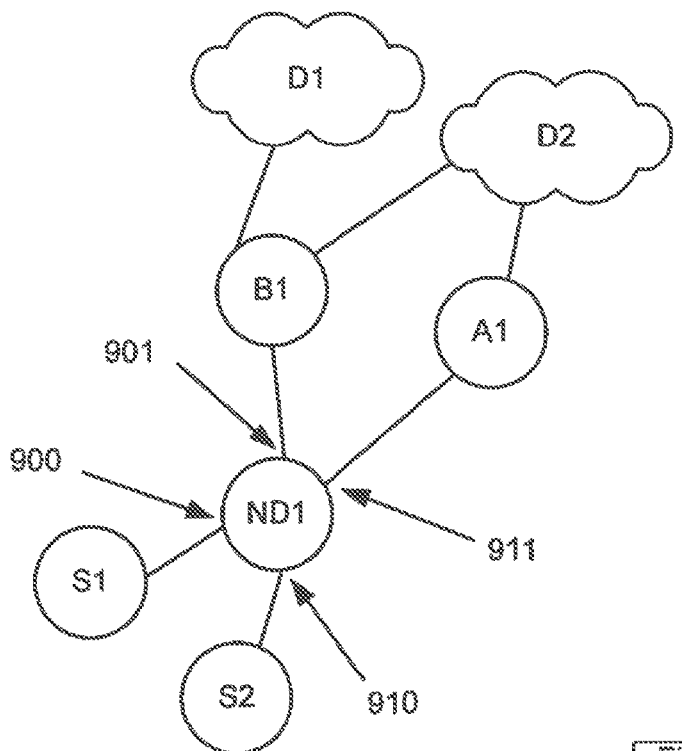
FIG. 9A shows a first example network topology in accordance with embodiments of the invention.
FIG. 9B shows a first example forwarding table in accordance with one or more embodiments of the invention.
FIG. 9C shows a first example nexthop table in accordance with one or more embodiments of the invention.
FIG. 9D shows a first example multipath table associated with a first network processor in accordance with one or more embodiments of the invention.
FIG. 9E shows a second example multipath table associated with a second network processor in accordance with one or more embodiments of the invention.

FIG. 9A shows an example of a network topology. The network includes a network device ND1. ND1 is configured to forward packets in accordance with embodiments of the invention. ND1 includes a first network processor with an ingress port (900) for receiving packets from source device S1. The first network processor also has an egress port (901). The egress port is operably connected to network infrastructure component B1. ND1 also includes a second network processor with an ingress port (910) for receiving packets from source device S2. The second network processor also has an egress port (911). The egress port is operably connected to network infrastructure component A1. Each of the network processors are also connected by a communication link (not shown).

In order to perform packet forwarding, FIG. 9B shows an example forwarding table of the network device. The forwarding table includes at least three entries that specify route prefixes, P1, P2, and P3, used to identify next hops of packets to be forwarded to destination device D or destination device D2. Each of the entries of the forwarding table also specify a multipath index associated with the route prefix of the entry. The multipath index may specify an entry of a multipath table that specifies and/or includes information that specifies a multipath group. Packets received by either network processor are matched to one of the three entries of the forwarding table and thereby a multipath table index for each received packet may be determined. The match may be performed by, for example, performing a longest prefix match process based on a destination of each packet to determine a route prefix for the packet. The determined route prefix may then be matched to a route prefix specified by one of the entries of the forwarding table, e.g., P1, P2, or P3. Other methods of matching packets to entries of the forwarding table may be used without departing from the invention.

FIG. 9C shows a nexthop table in accordance with embodiments of the invention. The nexthop table may be a shared nexthop table that includes 3 entries. Each of the entries includes a nexthop index and an egress port/MAC address information for forwarding packets.

FIG. 9D shows a first multipath table associated with the first network processor of ND1. The first multipath table includes a first entry, e.g., multipath Index of 1, that specifies a multipath group beginning at a nexthop index of B. The entry also specifies a size of 1. Thus, the multipath group specified includes nexthop index B. The first multipath table includes a second entry that specifies a multipath group including the nexthop table entries beginning at nexthop index C. The second entry also specifies a size of 1. Thus, the multipath group specified includes nexthop index C.

FIG. 9E shows a second multipath table associated with the second network processor of ND1. The second multipath table includes a single entry that specifies a multipath group including nexthop table entries starting at the nexthop index A. The entry also specifies a size of 1. Thus, the multipath group specified includes nexthop index A.

Based on the tables shown in FIGS. 9B-9E, when a packet is received by the first network processor that specifies a destination address of D2, an initial nexthop index of A or B will be obtained by the first network processor depending how packets are matched to entries of the forwarding table. For example, if a longest prefix match process is used and route prefix P1 is more specific, e.g., longer, than route prefix P2, route prefix P1 will be selected over route prefix P2.

Based on the multipath index specified by the forwarding table entry having a route prefix of P2, a nexthop index of B is selected. nexthop index B is selected based on the first multipath table. As seen in FIG. 9D, nexthop index B is selected by first determining the subset of the indexes listed in the first entry of the first multipath group, e.g., nexthop index B only due to the size being 1, because the second entry of the forwarding table specifies a multipath index of 1. A member of the subset is then selected at random. Here, nexthop index B is selected as the nexthop index because the subset only includes nexthop index B.

An egress port/MAC address 1/B1 is then selected based on matching the final nexthop index to nexthop index B of the nexthop table. The received packet updated to include MAC address B1 as the destination MAC address and forwarded out of the first egress port (901).

In another example based on the network topology and tables shown in FIGS. 9A through 9E, the first source S1 may send a packet to ND1. The packet may specify a destination of D1. The packet may be received by the ingress port (900) and obtained by the first network processor.

The first network processor may match the packet to the route prefix P1 by performing a longest prefix match process. Based on the match, the first network processor determines a multipath index of 2.

Using the multipath index of C, the first network processor identifies, using the first multipath table, that nexthop index C is a member of a multipath group specified by the second entry of the first multipath table. The second entry of the first multipath table is selected because the first network processor received the packet and the forwarding table entry having the route prefix P1 specifies a multipath index of 1. The multipath group specifies nexthop indexes of C as member, a size of 1, and an offset of 0.

The first network processor selects a nexthop index C based on the multipath group member. Specifically, the first network processor identifies a subset of the group members, in this case only including nexthop index C. The second network processor selects the nexthop index by randomly selecting a nexthop index from the identified subset, in this case the nexthop index of C.

Based on the nexthop index, the first network processor obtains an egress port/MAC address of 1/B1 and sends the packet using the obtained egress port/MAC address. Specifically, the first network processor relabels the packet to include a destination MAC address of B1 and sends the packet out of the first egress port (901).

EXAMPLE 2

FIG. 10A shows another example of a network topology where a new route has been added to the network topology shown in FIG. 9A.

A FIO of ND1 was notified of the new route and of a multipath group associated with the route. The FIO updated the forwarding information tables as shown in FIGS. 10B-10E.

FIG. 10B shows an example updated forwarding table of ND1. The updated forwarding table includes four entries that specify route prefixes, P1, P2, P3, P4, used to identify next hops forward packets to destination device D1 or destination device D2. Each of the entries of the updated forwarding table also specify a multipath table index associated with the route prefix of the entry. Packets received by either network processor are matched to one of the four entries of the updated forwarding table and thereby a multipath table index for each received packet may be determined. The match may be performed by, for example, performing a longest prefix match process based on a destination of each packet to determine a route prefix for the packet. The route prefix may then be matched to a route prefix specified by one of the entries of the forwarding table. Other methods of matching packets to entries of the forwarding table may be used without departing from the invention.

FIG. 10C shows an example updated nexthop table of the network device. The nexthop table includes four entries. Each of the entries includes a nexthop index and an egress port/MAC address information for forwarding packets. In comparison to the nexthop table shown in FIG. 9C, a new entry specifying nexthop Index C and specifying an egress port/MAC address of 1/A1 has been added.

FIG. 10D shows an updated first multipath table associated with the first network processor of ND1. The first multipath table includes a first entry that specifies a multipath group including the nexthop table entries starting at nexthop index B. The entry also specifies a size of 2. Thus, the entry specifies a multipath group having members of nexthop table indexes B and C. In comparison to the nexthop table shown in FIG. 9D, a new nexthop index has been added to the group members and the size has been increased from 1 to 2 based on the addition. The first ECMP table also includes a second entry that specifies a multipath group including the nexthop table entries having a nexthop index of D because a new nexthop table entry has been inserted when compared with the nexthop table shown in FIG. 9C. Returning to FIG. 10D, the entry also specifies a size of 1. Thus, the entry specifies a multipath group having members of nexthop table index D.

FIG. 10E shows an updated second multipath table associated with the second network processor of ND1. The second multipath table includes a single entry that specifies a multipath group including the nexthop table entries starting at nexthop index A. The entry also specifies a size of 1.

Based on the tables shown in FIGS. 10B-10E, when a packet is received by the first network processor that has a final destination of D2, a multipath index of 1 will be obtained by the first network processor because each index specifies a multipath table entry that specifies next hop information that may be used to forward the packet towards destination D2.

Based on the multipath table index, a nexthop index of B or C is selected. Nexthop index B or C is selected based on the first multipath table. As seen in FIG. 10D, the first multipath table entry, e.g., multipath index 1, specifies a multipath group including members specified by nexthop indexes of B and C. The first entry also specifies a size of the multipath group as two. Thus, a subset of B and C of the multipath group members is selected. A nexthop index of B or C is selected from the subset of B and C.

An egress port/MAC address of 1/B1 or 1/A1 is then selected based on matching the nexthop index to nexthop index of B or C to the nexthop table entries specified by the final nexthop index of B or C. The received packet is then forwarded out the first egress port (901) and the packet is relabeled to have a destination MAC address of A1 or B1.

When a packet is received by the second network processor that has a packet identifier of D2, a multipath table index of 1 will be obtained by the first network processor based on a matching process such as, for example, a longest prefix match processes.

Based on the multipath table index, a nexthop index of A is selected. Nexthop index A is selected based on the second multipath table because the packet was received by the second network processor. As seen in FIG. 10E, the second multipath table entry specifies a multipath group including members defined by nexthop index of A. The first entry also specifies a size of the multipath group of 1. Thus, a subset of A is selected. A final nexthop index of A is then selected from the subset of A by a hashing.

An egress port/MAC address of 2/A1 is selected based on matching the nexthop index A to the nexthop table entry specified by the nexthop index of A. The received packet is then forwarded by the second egress port (922) to MAC address A1.

Thus, ND1 forwards packets received by each network process by way of local egress ports to facilitate packet forwarding. ND1 shares a nexthop table by two network processor.

EXAMPLE 3

Figures 11A, 11B:
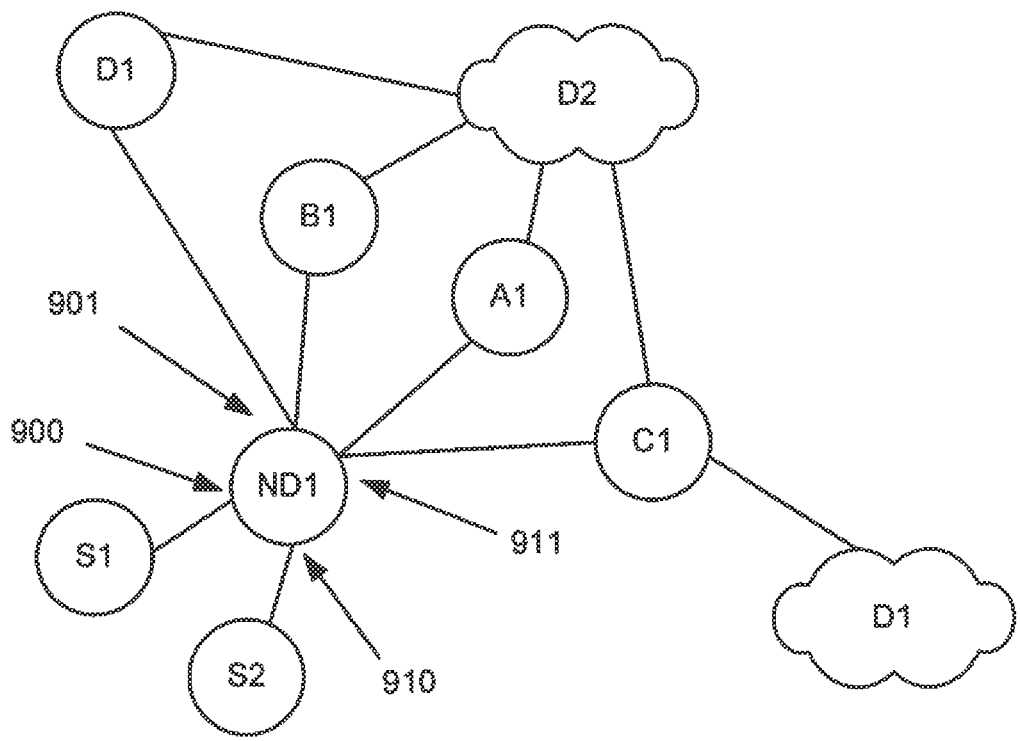
FIG. 11A shows a third example network topology in accordance with embodiments of the invention.
FIG. 11B shows a third example forwarding table in accordance with one or more embodiments of the invention.

FIG. 11A shows a third example of a network topology. The network includes a network device ND1. ND1 is configured to forward packets in accordance with embodiments of the invention. ND1 includes a first network processor with an ingress port (900) for receiving packets from source device S1. The first network processor also has an egress port (901). The egress port (901) is operably connected to network infrastructure components B1 and D1. ND1 also includes a second network processor with an ingress port (910) for receiving packets from source device S2. The second network processor also has an egress port (911). The egress port (911) is operably port (911) is connected to network infrastructure components A1 and C1. Each of the network processors is also connected by a communication link (not shown).

FIG. 11B shows an example of a forwarding table of ND1. The forwarding table includes five entries that specify route prefixes, P1, P2, P3, P4, or P5, used to identify next hops of packets to be forwarded to destination device D or destination device D2. Each of the entries of the forwarding table also specify a multipath table index associated with the route prefix of the entry. Packets received by either network processor are matched to one of the five entries of the forwarding table and thereby a multipath table index for each received packet may be determined.

FIGS. 11C-11E show examples of nexthop tables and multipath tables programmed according to a first embodiment of the invention. In the first embodiment, a shared nexthop table is programmed that is utilized by both the first and second network processors of ND1. Duplicate copies of the shared nexthop table may be stored on each of the network processors.

FIGS. 11F-11H show examples of nexthop tables and multipath tables programmed according to a second embodiment of the invention. In the second embodiment, a shared multipath table is programmed that is utilized by both the first and second network processors of ND1. Duplicate copies of the shared multipath table may be stored on each of the network processors.

FIGS. 11I-11L show examples of nexthop tables and multipath tables programmed according to a third embodiment of the invention. In the third embodiment, there are no shared tables.

Returning to the first embodiment, FIG. 11C shows a shared nexthop table of the network device. The shared nexthop table includes five entries. Each of the entries includes a nexthop index and an egress port/MAC address information for forwarding packets.

FIG. 11D shows a first multipath table associated with the first network processor of ND1. The first multipath table includes a single entry that specifies a multipath group including the nexthop table entries starting at nexthop index A. The entry also specifies a size of 2. Thus, the entry specifies a multipath group including nexthop indexes of A-B.

FIG. 11E shows a second multipath table associated with the second network processor of ND1. The second multipath table includes a first entry that specifies a multipath group including the nexthop table entries starting at nexthop index C, e.g., an offset of 2. The entry also specifies a size of 2.

Thus, the entry specifies a multipath group including nexthop indexes of C-D. The second multipath table also includes a second entry that specifies a multipath group including the nexthop table entries starting at nexthop index E. The entry also specifies a size of 1. Thus, the entry specifies a multipath group including nexthop index E.

Based on the tables shown in FIGS. 11B-10E, when a packet is received by the first network processor that has a packet identifier of D1, a multipath table index of 1 will be obtained by the first network processor because each member of the multipath group specified by and multipath table entry having an index of 1 causes the packet to be transmitted towards its final destination.

Based on the multipath table index, a nexthop index of A or B is selected. Nexthop index A or B is selected based on the first multipath table. As seen in FIG. 11D, the first multipath table entry, e.g., the multipath table entry having an index of 1 and associated with the first network processor, specifies a multipath group specified by nexthop indexes of A-B Thus, a subset of A and B is selected. A nexthop index of A or B is selected from the subset of A and B.

An egress port/MAC address of 1/B1 or 1/D1 is then selected based on matching the nexthop index of A or B to the nexthop table entries specified by the nexthop index of A or B. The received packet is then forwarded by the first egress port (901) to MAC address B1 or D1 based on the match.

Moving to the second embodiment, FIG. 11F shows a first nexthop table associated with the first network processor. The first nexthop table includes two entries. Each of the entries includes a nexthop index and an egress port/MAC address information for forwarding packets.

FIG. 11G shows a second nexthop table associated with the second network processor. The second nexthop table includes three entries. Each of the entries includes a nexthop index and an egress port/MAC address information for forwarding packets.

FIG. 11H shows a shared multipath table that is utilized by both network processors of ND1, e.g., copies of the table are stored on each of the network processors. The shared multipath table includes a first entry that specifies a multipath group including the nexthop table entries having nexthop indexes of A or B assuming a predetermined group size of 2. The shared multipath table also includes a second entry that specifies a multipath group including the nexthop table entries having a nexthop index of C.

Based on the tables shown in FIGS. 11F-11H, when a packet is received by the first network processor that has a destination address of D1, a multipath table index of 1 will be obtained by the first network processor as discussed with respect to the first embodiment.

Based on the multipath table index, a nexthop index of A or B is selected. Nexthop index A or B is selected using the shared multipath table. As seen in FIG. 11H, the shared multipath table entry specifies a multipath group specified by nexthop indexes of A and B, e.g., the first entry of the shared multipath table that has a multipath index of 1. A final nexthop index of A or B is selected from the multipath group members specified by multipath table entry, e.g., members A and B.

An egress port/MAC address of 1/B1 or 1/D1 is then selected based on matching the nexthop index of A or B to the nexthop table entries of the first nexthop table specified by the nexthop index of A or B. The first nexthop table is used here because the packet was received by the first network processor. The received packet is then forwarded by the first egress port (901) to MAC address B1 or D1.

When a packet is received by the second network processor that has a destination address of D1, a multipath table index of A or B will be obtained by the first network processor as discussed with respect to the first embodiment.

Based on the multipath table index, a nexthop index of A or B is selected. Nexthop index A or B is selected using the shared multipath table. As seen in FIG. 11H, the shared multipath table entry specifies a multipath group specified by nexthop indexes of A and B. A nexthop index of A or B is randomly selected from the subset of A and B.

An egress port/MAC address of 2/A1 or 2/C1 is then selected based on matching the nexthop index to of A or B to the nexthop table entries of the second nexthop table specified by the nexthop index of A or B. The second nexthop table is used here because the packet was received by the second network processor. The received packet is then forwarded by the second egress port (911) to MAC address A1 or C1.

Moving to the third embodiment, FIG. 11I shows a first nexthop table associated with the first network processor. The first nexthop table includes two entries. Each of the entries includes a nexthop index and an egress port/MAC address information for forwarding packets.

FIG. 11J shows a second nexthop table associated with the second network processor. The second nexthop table includes three entries. Each of the entries includes a nexthop index and an egress port/MAC address information for forwarding packets.

FIG. 11K shows a first multipath table associated with the first network processor of ND1. The first multipath table includes a single entry that specifies a multipath group including the first nexthop table entries having nexthop indexes of A or B.

FIG. 11L shows a second multipath table associated with the second network processor of ND1. The second multipath table includes a first entry that specifies a multipath group including the first nexthop table entries having nexthop indexes of A or B. The second multipath table also includes a second entry that specifies a multipath group including the nexthop table entries having a nexthop index of C.

Based on the tables shown in FIGS. 11I-11L, when a packet is received by the first network processor that has a destination address of D1, a multipath table index of A or B will be obtained as discussed with respect to the first embodiment.

Based on the multipath table index, a nexthop index of A or B is selected. Nexthop index A or B is selected using the first multipath table. A nexthop index of A or B is selected from the subset of A and B.

An egress port/MAC address of 1/B1 or 1/D1 is then selected based on matching the nexthop index of A or B to the nexthop table entries of the first nexthop table specified by the final nexthop index of A or B. The received packet is then forwarded by the first egress port (901) to MAC address B1 or D1.

In another example based on the network topology and tables shown in FIGS. 11A through 11E, the second source S2 may send a packet to ND1. The packet may specify a destination of D1. The packet may be received by the second ingress port (910) and obtained by the second network processor.

The second network processor may match the packet to the route prefix P5 by performing a longest prefix match process. Based on the match, the second network processor determines a multipath table index of 2.

Using the multipath table index, the second network processor identifies, using the second multipath table, that nexthop index E is a member of a multipath group. The multipath group specifies nexthop indexes of E as a member and a size of 1.

The second network processor selects a nexthop index E based on the multipath group member. Specifically, the second network processor identifies a subset of the group members, in this case only including nexthop index C. The second network processor selects the nexthop index by randomly selecting a nexthop index from the identified subset, in this case the nexthop index of C.

Based on the nexthop index, the second network processor obtains an egress port/MAC address of 2/C1 and sends the packet using the obtained egress port/MAC address. Specifically, the second network processor relabels the packet to include a destination MAC address of C1 and sends the packet out of the second egress port (911).

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of operating a network processor, comprising:
   obtaining, by the network processor (NP) of a plurality of NPs of a network device, a packet;
   determining, by the NP, a multipath table index from a forwarding table associated with the NP;
   identifying, by the NP, a multipath group specified in an entry of a multipath table associated with the NP using the multipath table index, wherein the multipath group comprises only a plurality of local egress ports that are local to the NP, and no foreign egress ports that are local to a second NP of the plurality of NPs;
   selecting, by the NP a nexthop index from a plurality of nexthop indexes specified by the multipath group;
   obtaining, by the NP, a port of the plurality of local egress ports and a media access control (MAC) address from a nexthop table entry using the nexthop index; and
   transmitting, by the NP, the packet via the port to a second network device using the MAC address.

2. The method of claim 1, wherein selecting, by the NP, the nexthop index comprises:
   performing a hash on at least a portion of the packet to obtain a hash value; and
   selecting the nexthop index from the plurality of nexthop indexes using the hash value.

3. The method of claim 1, wherein selecting, by the NP, the nexthop index comprises:
   identifying a subset of the nexthop indexes from the plurality of nexthop indexes based on a size specified in the entry of the multipath table, wherein the size comprises a quantity of next hops in the multipath group;
   performing a hash on at least a portion of the packet to obtain a hash value; and
   selecting the nexthop index from the subset of the nexthop indexes using the hash value.

4. The method of claim 3, wherein the size is less than a cardinality of multipath group members of the multipath group.

5. The method of claim 1, wherein selecting, by the NP, the nexthop index comprises:
- identifying a subset of the nexthop indexes from the plurality of nexthop indexes based on a size and an offset specified in the entry of the multipath table, wherein the size comprises a quantity of next hops in the multipath group;
- performing a hash on at least a portion of the packet to obtain a hash value; and
- selecting the nexthop index from the subset of the nexthop indexes using the hash value.

6. The method of claim 5, wherein the size is less than a cardinality of multipath group members of the multipath group.

7. A non-transitory computer readable medium comprising instructions that, when executed by a processor, perform a method of operating a network processor, the method comprising:
- obtaining, by the network processor (NP) of a plurality of NPs of a network device, a packet;
- determining, by the NP, a multipath table index from a forwarding table associated with the NP;
- identifying, by the NP, a multipath group specified in an entry of a multipath table associated with the NP using the multipath table index, wherein the multipath group comprises only a plurality of local egress ports that are local to the NP, and no foreign egress ports that are local to a second NP of the plurality of NPs;
- selecting, by the NP, a nexthop index from a plurality of nexthop indexes specified by the multipath group;
- obtaining, by the NP, a port of the plurality of local egress ports and a media access control (MAC) address from a nexthop table entry using the nexthop index; and
- transmitting, by the NP, the packet via the port to a second network device using the MAC address.

8. The non-transitory computer readable medium of claim 7, wherein selecting, by the NP, the nexthop index comprises:
- performing a hash on at least a portion of the packet to obtain a hash value; and
- selecting the nexthop index from the plurality of nexthop indexes using the hash value.

9. The non-transitory computer readable medium of claim 7, wherein selecting, by the NP, the nexthop index comprises:
- identifying a subset of the nexthop indexes from the plurality of nexthop indexes based on a size specified in the entry of the multipath table, wherein the size comprises a quantity of next hops in the multipath group;
- performing a hash on at least a portion of the packet to obtain a hash value; and
- selecting the nexthop index from the subset of the nexthop indexes using the hash value.

10. The non-transitory computer readable medium of claim 9, wherein the size is less than a cardinality of multipath group members of the multipath group.

11. The non-transitory computer readable medium of claim 7, wherein selecting, by the NP, the nexthop index comprises:
- identifying a subset of the nexthop indexes from the plurality of nexthop indexes based on a size and an offset specified in the entry of the multipath table, wherein the size comprises a quantity of next hops in the multipath group;
- performing a hash on at least a portion of the packet to obtain a hash value; and
- selecting the nexthop index from the subset of the nexthop indexes using the hash value.

12. The non-transitory computer readable medium of claim 11, wherein the size is less than a cardinality of multipath group members of the multipath group.

* * * * *